(12) United States Patent
Frenger et al.

(10) Patent No.: US 10,701,659 B2
(45) Date of Patent: Jun. 30, 2020

(54) HANDLING TRACKING AREA INFORMATION IN A WIRELESS COMMUNICATION NETWORK

(71) Applicant: Telefonaktiebolaget LM Ericsson (publ), Stockholm (SE)

(72) Inventors: Pål Frenger, Linköping (SE); Fredrik Gunnarsson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/096,221

(22) PCT Filed: Apr. 27, 2017

(86) PCT No.: PCT/SE2017/050414
§ 371 (c)(1),
(2) Date: Oct. 24, 2018

(87) PCT Pub. No.: WO2017/200453
PCT Pub. Date: Nov. 23, 2017

(65) Prior Publication Data
US 2019/0141659 A1 May 9, 2019

Related U.S. Application Data

(60) Provisional application No. 62/328,636, filed on Apr. 28, 2016.

(51) Int. Cl.
*H04W 24/00* (2009.01)
*H04W 64/00* (2009.01)
(Continued)

(52) U.S. Cl.
CPC .......... *H04W 64/00* (2013.01); *H04W 60/04* (2013.01); *H04W 76/10* (2018.02);
(Continued)

(58) Field of Classification Search
CPC ..... H04W 64/00; H04W 76/10; H04W 88/02; H04W 8/245; H04M 1/72519; H04M 1/72522
(Continued)

(56) References Cited

U.S. PATENT DOCUMENTS 8,983,496 B1 * 3/2015 Vivanco .............. H04W 64/006
455/456.1
9,357,400 B2 * 5/2016 Hedberg ............... H04W 16/14
(Continued)

FOREIGN PATENT DOCUMENTS

EP 0724817 B1 4/2003
WO 2008054668 A2 5/2008

*Primary Examiner* — Danh C Le
(74) *Attorney, Agent, or Firm* — Murphy, Bilak & Homiller, PLLC

(57) ABSTRACT

A method performed by a User Equipment, UE, for handling Tracking Area, TA, information for the UE is provided. The UE operates in a wireless communications network. The UE obtains (401) a TA configuration comprising a list of allowed Tracking Area Codes, TACs, for the UE. The UE obtains (402) a first TAC and a first Tracking Area Part code, TAP. The first TAC relates to a TA. The TA comprises a number of TA parts, each TA part being associated with a TAP. The UE determines (403) a second TAC based on a combination the first TAC and the first TAP. When the second TAC is not in the list comprised in the TA configuration, the UE requests (404) updated TA information.

20 Claims, 15 Drawing Sheets

(51) Int. Cl.
*H04W 60/04* (2009.01)
*H04W 76/10* (2018.01)
*H04M 1/725* (2006.01)
*H04W 8/24* (2009.01)
*H04W 88/02* (2009.01)

(52) U.S. Cl.
CPC .... *H04M 1/72519* (2013.01); *H04M 1/72522* (2013.01); *H04W 8/245* (2013.01); *H04W 88/02* (2013.01)

(58) Field of Classification Search
USPC .................. 455/456.1, 456.5, 550.1, 418
See application file for complete search history.

(56) References Cited

U.S. PATENT DOCUMENTS

| | | | |
|---|---|---|---|
| 2008/0220782 A1 | 9/2008 | Wang et al. | |
| 2008/0254812 A1* | 10/2008 | Kitazoe | H04W 28/08 455/456.2 |
| 2010/0039991 A1* | 2/2010 | Godin | H04W 24/02 370/328 |
| 2010/0151864 A1* | 6/2010 | Mori | H04J 11/0069 455/436 |
| 2012/0309419 A1 | 12/2012 | Lee et al. | |
| 2013/0111044 A1* | 5/2013 | Cherian | H04W 76/10 709/228 |
| 2013/0130727 A1* | 5/2013 | Hakola | H04W 68/02 455/458 |
| 2013/0203415 A1* | 8/2013 | Arvidsson | H04W 60/00 455/435.1 |
| 2014/0038620 A1* | 2/2014 | Hedberg | H04W 48/10 455/448 |
| 2014/0044058 A1* | 2/2014 | El-saidny | H04W 72/048 370/329 |
| 2014/0106790 A1* | 4/2014 | Kakinada | H04W 68/02 455/458 |
| 2016/0066296 A1* | 3/2016 | Su | H04W 68/005 455/458 |
| 2016/0128020 A1* | 5/2016 | Agarwal | H04W 68/04 370/328 |
| 2016/0262130 A1* | 9/2016 | Johansson | H04L 41/0672 |
| 2017/0078874 A1* | 3/2017 | Lee | H04W 12/04 |
| 2017/0118739 A1* | 4/2017 | Ballantyne | H04W 68/02 |
| 2017/0164144 A1* | 6/2017 | Panchabhai | H04L 65/1006 |
| 2017/0223856 A1* | 8/2017 | Rohan | H02J 9/06 |
| 2017/0250978 A1* | 8/2017 | Wang | H04L 63/0823 |
| 2017/0331670 A1* | 11/2017 | Parkvall | H04W 52/0274 |
| 2018/0007733 A1* | 1/2018 | Mochizuki | H04W 48/16 |
| 2018/0084486 A1* | 3/2018 | Pradas | H04W 24/10 |
| 2018/0279087 A1* | 9/2018 | Chen | H04W 4/029 |
| 2018/0340801 A1* | 11/2018 | Kelley | G01D 5/353 |
| 2018/0376452 A1* | 12/2018 | Wei | H04W 76/28 |
| 2019/0053192 A1* | 2/2019 | Rune | H04W 68/06 |
| 2019/0208498 A1* | 7/2019 | Moriwaki | H04W 24/08 |

\* cited by examiner

HANDLING TRACKING AREA INFORMATION IN A WIRELESS COMMUNICATION NETWORK

TECHNICAL FIELD

Embodiments herein relate to a network, a radio network node, a user equipment and methods performed therein. In particular, embodiments herein relates to handling tracking area information in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain.

Paging and Tracking

Paging is a procedure that may be used for network initiated connection setup e.g. when a UE is in an RRC_IDLE state in case of LTE. In LTE, the UE camps on a selected cell and monitors the Layer 1 (L1)/Layer 2 (L2) control signaling for paging messages.

While the UE is in RRC_IDLE state its location is known by the LTE network at Tracking Area (TA) level, i.e. on a TA granularity, instead of cell level. An operator defines a group of neighbor eNBs as a TA. A TA may be made up of cells or eNBs.

A paging cycle is defined, allowing the UE to sleep most of the time and only briefly wake up to monitor L1/L2 control signaling. The maximum and most power efficient paging cycle in LTE is 2.56 seconds. Future networks will support even longer paging cycles e.g. 24 hours for Massive Machine Type Communication (M-MTC) devices and applications.

The tracking area configuration in the UE is controlled by an Mobility Management Entity (MME). Since the UE location is typically not known, the paging message is transmitted across several cells in one or more tracking areas. The UE periodically wakes up and determines which tracking area that it is currently located in and in case the tracking area is not in the allowed tracking area list the UE initiates a location area update procedure in order to inform the network of its current location.

A UE may be configured with a list of tracking areas that it can move between in idle mode. This reduces the number of location area updates the UE has to perform.

Paging is normally done first in a smaller area, one of a few cells, and if the UE is not found there the network pages the UE in a larger area, e.g. all cells in the tracking area list.

Tracking and Paging Area Size

Future networks may comprise 50-500 billion devices such as UEs and other devices with very different behavior making UE optimized tracking increasingly important. However tracking requirements differ for different UEs and may also differ over time.

Small tracking areas are beneficial for UEs with:
  Stationary or low mobility;
    Predictable low mobility for extended time duration such as e.g. smart phone at night or in drawer;
    Long DRX and/or low user-plane activity, allowing for a small number of paging attempts.
Large tracking areas (or large TA lists) beneficial for UEs with
    High mobility (to enable fewer location area updates);
    Short DRX (high user-plane activity) i.e. UEs that can read paging channels often.

From the network point of view the design of tracking areas also involves several conflicting objectives:
  TAC and sync-signal may need to be transmitted often when UEs wake up from long DRX with high clock uncertainty which is costly;
  Small tracking areas create many LA-updates or requires large TA-lists which results in increased signaling costs;
  Large tracking areas increase the paging load in the network which results in increased signaling costs;
  Transmission of Tracking Area Code (TAC) requires network nodes to periodically become active, which increases network node energy consumption.

NX System Information Acquisition

5G-NX, sometimes denoted 5G new radio (NR), is a new Radio Access Technology (RAT) designed to meet 5G system requirements. There are three main challenges that need to be addressed by 5G wireless communication systems to enable a truly Networked Society, where information can be accessed and data shared anywhere and anytime, by anyone and anything. These are:

A massive growth in the number of connected devices.
A massive growth in traffic volume.
An increasingly wide range of applications with varying requirements and characteristics.

To handle massive growth in traffic volume, wider frequency bands, new spectrum, and in some scenarios denser deployment are needed.

For 5G-NX, also referred to as 5G-NR, an index-based system information distribution concept is considered. The 5G-NX discusses a two-step mechanism for transmitting access information, comprising an Access Information Table (AIT). The AIT comprises a list of access information configurations and a short System Signature Index (SSI) which provides an index pointing to a certain configuration in the AIT, defining the access information, see FIG. 1.

FIG. 1 depicts the principle of AIT and SSI transmissions from a network node to a UE in a 5G-NX system. The top part of FIG. 1 depicts a time-frequency grid with periodic transmissions of SSI and AIT information. The bottom part of FIG. 1 depicts how the SSI is used to derive access information from the AIT.

The content of the AIT is assumed to be known by the UE when performing a random access attempt. The AIT in the UE may e.g. be updated in two ways;

1. A Common AIT (C-AIT) is broadcasted by the network, typically with a longer periodicity than the SSI e.g. every 500 ms or so. In some deployments the C-AIT periodicity may be the same as the SSI periodicity (e.g. in small indoor networks) and the maximum C-AIT periodicity may be very large e.g. 10 seconds in order to support extremely power limited scenarios (e.g. off-grid solar powered base stations).

2. A Dedicated AIT (D-AIT) transmitted to the UE using dedicated signaling in a dedicated beam after initial system access. The UE specific D-AIT may use the same SSIs to point to different configurations for different UEs. For instance, in the case of system congestion, this would allow to have different access persistency values for different UEs.

The SSI period is typically shorter than that of the C-AIT. The value is a tradeoff between system energy performance, UE energy performance and access latency in cases SSI needs to be read before access.

One delivery option for C-AIT is self-contained transmission in which all nodes transmit both C-AIT and SSI, with C-AIT entries referring only to themselves. However, there may be heavy interference for C-AIT reception within a synchronized network on the same frequency. To avoid C-AIT interference, C-AIT may be time-shifted in different networks.

FIG. 2 depicts more details of how the SSI and AIT principles may be implemented in 5G NR. The System Information (SI) in 5G NR is separated into "minimum SI" and "other SI". The minimum SI is further divided into an SS Block and a transmission of system information block 1 referred to as NR-SIB1. The SS Block comprises synchronization signals primary synchronization signal referred to as NR-PSS and secondary synchronization signal referred to as NR-SSS. The combined sequence index of the NR-PSS/NR-SSS constitutes a Physical Cell Identity (PCI). In addition the SS Block comprises a Tertiary Synchronization Signal (NR-TSS) which may indicate a SS Block index in a burst of SS Blocks, denoted TSS-index in FIG. 2. In addition to the PCI index and the TSS index the Master Information Block (NR-MIB) provided inside of the Physical Broadcast Channel (NR-PBCH) may comprise an additional System Information Configuration Index (SICI), not shown in FIG. 2. In addition to the SS Block the minimum SI also comprises a transmission of NR-SIB1 which is provided by the Physical Downlink Control Channel (NR-PDCCH) and the Physical Downlink Shared Channel (NR-PDSCH) configured in the NR-MIB.

In the context of SSI/AIT described above in FIG. 1, any one of PCI, TSS-index or SICI, or a combination of these indexes, may be viewed as an SSI. The C-AIT described above would correspond to the NR-SIB1 in FIG. 2.

Since the configuration of the physical channels that provide NR-SIB1 are configured in the NR-MIB, the NR-SIB1 may be transmitted with explicitly configured parameters such as Demodulation Reference Signals (DMRS), scrambling, quasi-co-location assumptions, numerology, control-channel search-space, carrier, etc. This design enables a very large deployment flexibility in delivery of NR-SIB1. NR-SIB1 may e.g. comprise information relevant for more than once cell and it may be transmitted jointly from multiple network nodes. A cell is defined by the PCI which is part of the SS Block transmission. In case a cell has multiple beams the SS Block can be transmitted in each of these beams.

But the transmission NR-SIB1 is not limited to be transmitted in the same beams or cells that are used for transmission of the SS Block. And the NR-SIB1 may comprise information related to multiple beams and cells. A UE will extract the information it must know in order to access the system by combining the indexes derived from the reception of the SS Block with the information it finds in the NR-SIB1. In some deployments NR-SIB1 may even be provided by another RAT e.g. LTE.

The UE may store the NR-SIB1 and use the information later in another cell or beam in the network. In order to ensure that the information in the stored NR-SIB1 is still valid it is expected that the NR-MIB will contain additional information such as a system information valueTag and a System Information Area (SIA) code that determines the NR-SIB1 validity. In addition it is expected that the system information valueTag is associated with a validity timer, e.g. of 3 hours as in LTE.

SUMMARY

An object herein is to provide a mechanism for handling TA information for a UE that improves the performance of a wireless communication network.

According to a first aspect the object is achieved by example embodiments of a method performed by a User Equipment, UE, for handling Tracking Area, TA, information for the UE. The UE operates in a wireless communications network. The UE obtains a Tracking Area, TA, configuration comprising a list of allowed Tracking Area Codes, TACs, for the UE. The UE obtains a first TAC and a first Tracking Area Part code, TAP. The first TAC relates to a TA. The TA comprises a number of TA parts, each TA part being associated with a TAP. The UE determines a second TAC based on a combination the first TAC and the first TAP. When the second TAC is not in the list comprised in the TA configuration, the UE requests updated TA information.

According to a second aspect the object is achieved by example embodiments of a method performed by a radio network node for handling Tracking Area, TA, information for a User Equipment, UE. The UE and the radio network node operate in the wireless communications network. The radio network node transmits a first Tracking Area Code, TAC, to be received by at least the UE 120. The first TAC relates to a Tracking Area: The TA comprises a number of TA parts, wherein each TA part is associated with a Tracking Area Part code, TAP. The UE then transmits 503 a first TAP to be received by at least the UE 120.

According to a third aspect the object is achieved by example embodiments of a User Equipment, UE, 120 for handling Tracking Area, TA, information for the UE. The UE 120 is configured to operate in a wireless communications network. The UE is configured to:
  Obtain a Tracking Area, TA, configuration adapted to comprise a list of allowed Tracking Area Codes, TACs, for the UE,
  obtain a first TAC and a first Tracking Area Part code, TAP, which first TAC is adapted to relate to a TA, which TA adapted to comprise a number of TA parts, each TA part adapted to being associated with a TAP,
  determine a second TAC based on a combination the first TAC and the first TAP, and
  when the second TAC is not in the list comprised in the TA configuration, request updated TA information.

According to a fourth aspect the object is achieved by example embodiments of a radio network node for handling Tracking Area, TA, information for a User Equipment, UE. The UE and the radio network node are configured to operate in the wireless communications network. The radio network node is configured to:
  Transmit a first Tracking Area Code, TAC, adapted to be received by at least the UE. The first TAC is adapted to relate to a Tracking Area. The TA is adapted to comprise a number of TA parts, each TA part being adapted to be associated with a Tracking Area Part code, TAP, and
  transmit a first TAP adapted to be received by at least the UE.

Embodiments herein uses a combination of the received first TAC and the TAP for determining a second TAC which results in high precision tracking for UEs that benefit from better tracking accuracy. By tracking the UE with high accuracy the UE may also listen for paging messages during a very short time, which reduces idle mode battery consumption.

A "high precision tracking" and "better tracking accuracy" when used herein means to more precisely identify where the UE is located. In this way the performance of a wireless communication network is improved. Better tracking accuracy enables paging messages to be transmitted over a smaller area. It may enable the network to directly find a UE in the correct cell without first searching in a small area and gradually expanding the search. It may also enable UEs to have a shorter "on duration" time when listening for paging messages and thereby enhance the UE battery life.

Embodiments herein further enables tracking information to be monitored on two different levels. This enables better tracking and paging support for both stationary UEs as well as high mobility UEs.

By using embodiments herein tracking area information may be sent from a higher network hierarchic level than today which will reduce the cost for maintaining tracking area information at system and UE level.

At the same time support high precision tracking for UEs that benefit from better tracking accuracy as mentioned above where one specific example is tracking of nomadic devices, where the possibility to be able to define high precision tracking areas enables an efficient monitoring of such devices, where the key challenge is to be aware of whether the nomadic device is still stationary or has moved. This can also be seen as idle mode positioning or geofencing. Nomadic devices are devices that normally do not move much in the network. Once they have established network connection and become operational they are likely to remain in the same location for significant time duration. Examples of such devices are temperature sensors, connected fire alarms, surveillance cameras, equipment or gods at a depot or warehouse, etc.

BRIEF DESCRIPTION OF THE DRAWINGS

Embodiments will now be described in more detail in relation to the enclosed drawings, in which.

DETAILED DESCRIPTION

Figure 1:
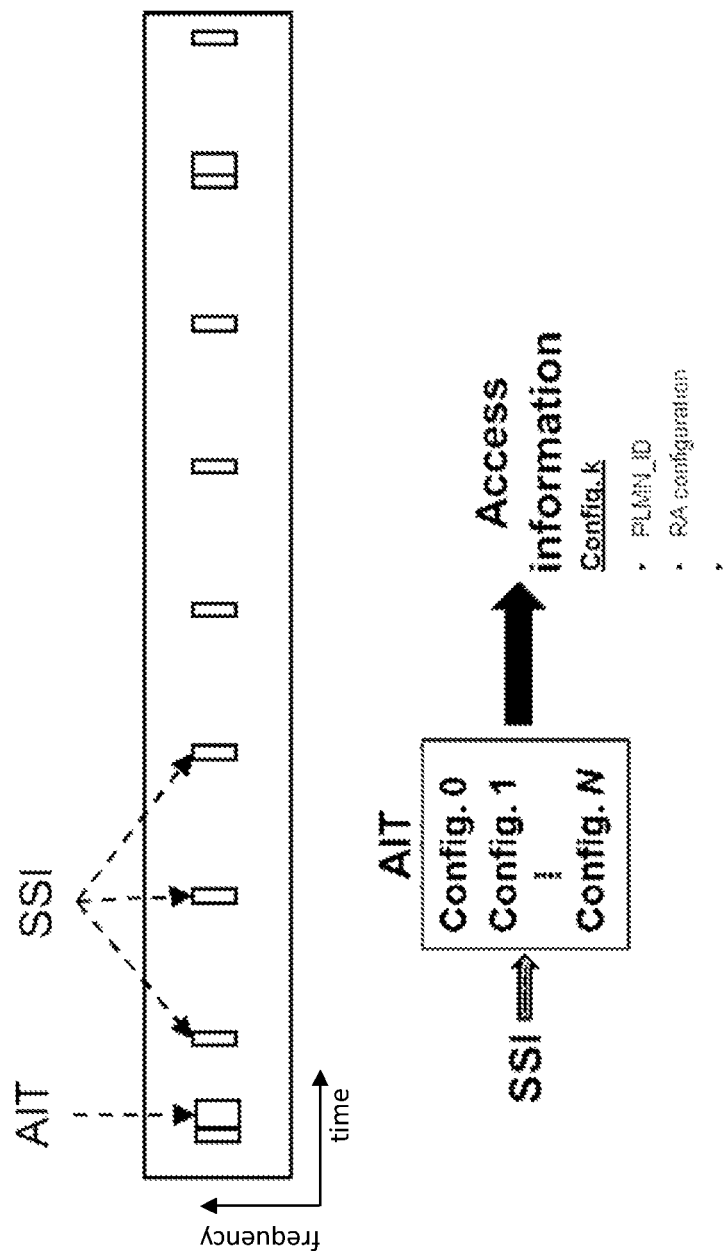
FIG. 1 is a schematic block diagram depicting transmissions from in a 5G-NX system according to prior art.

As part of developing embodiments herein, a problem will first be identified and discussed.

Physical Anchor Channel (PACH)

In the NX concept the C-AIT is transmitted in a physical channel denoted Physical Anchor Channel (PACH). The PACH uses demodulation reference signals and scrambling that is specified in the SSB. The PACH may be interpreted as the validity area of NR-IB1. In some deployments this may be interpreted as the coverage area of physical channel NR-PDCCH/NR-PDSCH that provides the UE with NR- SIB1 in FIG. 2. In some deployments the PACH is identical to the SIA specified in NR-MIB, as discussed above, see FIG. 2.

By introducing a PACH or a SIA, a network hierarchy level above the current sector cell is created. This network hierarchy level is sometimes denoted anchor cell, or Hyper-Cell comprising of several traditional cells. An anchor cell supports the deployment of CoMP and C-RAN architecture. Solutions related to mobility may be improved and handovers inside of an anchor cell can more easily be made transparent to the UEs.

Furthermore, by introducing an anchor cell, broad-cast of system information to be transmitted using a broadcast transmission format such as SFN is enabled.

In addition to the C-AIT the PACH may also contain other system wide information e.g. Global time; Public Land Mobile Network IDentity (PLMN) ID List; tracking area code; Common AC Barring; ETWS related information; IRAT neighbor information; etc.

Defining an area size of the TAC that is optimum for all UEs is not possible. Either the size is too small giving high overhead for UEs with low tracking accuracy requirements, or the size is too large giving too low tracking accuracy for UEs with need for high precision paging. Furthermore, deciding when and where to transmit TAC information is non-trivial when to transmit TAC, e.g. periodicity, depends on e.g. UE DRX cycles and/or it is expensive to always transmit TAC from all frequency bands and all from all nodes in a network.

In an ultra-lean system such as 5G-NX it is wanted to avoid sending system information, such as tracking information, from each node.

When introducing a channel, here denoted physical anchor channel, on a higher level than the current cell, the higher level cell is here denoted anchor cell, tracking on different hierarchical levels may be performed instead: Either by sending tracking information from the "cell level", i.e. a signal or message related to the SSI/SSB, which is good in some cases as there is a direct correspondence between tracking information and a node on "cell level". Or by sending tracking information from the "anchor cell level", i.e. a signal a signal or message related to the PACH, which is good as devices such as UEs does not need to do unnecessary signaling due to the deployment characteristic of the network, but possibly at an additional cost due to less high performance paging.

For most cases "anchor cell level tracking" e.g. supported by sending tracking information in the PACH would be beneficial, but not for all cases. For example M-MTC UEs that need to have low energy consumption, has low mobility and are very numerous need very high precision paging. Tracking them on a "lower level" (i.e. below anchor cell level) would enable longer sleep duration, and hence less UE power consumption, as well sending the paging message over a smaller area, and thereby the paging load in the network is reduced.

Figure 3:
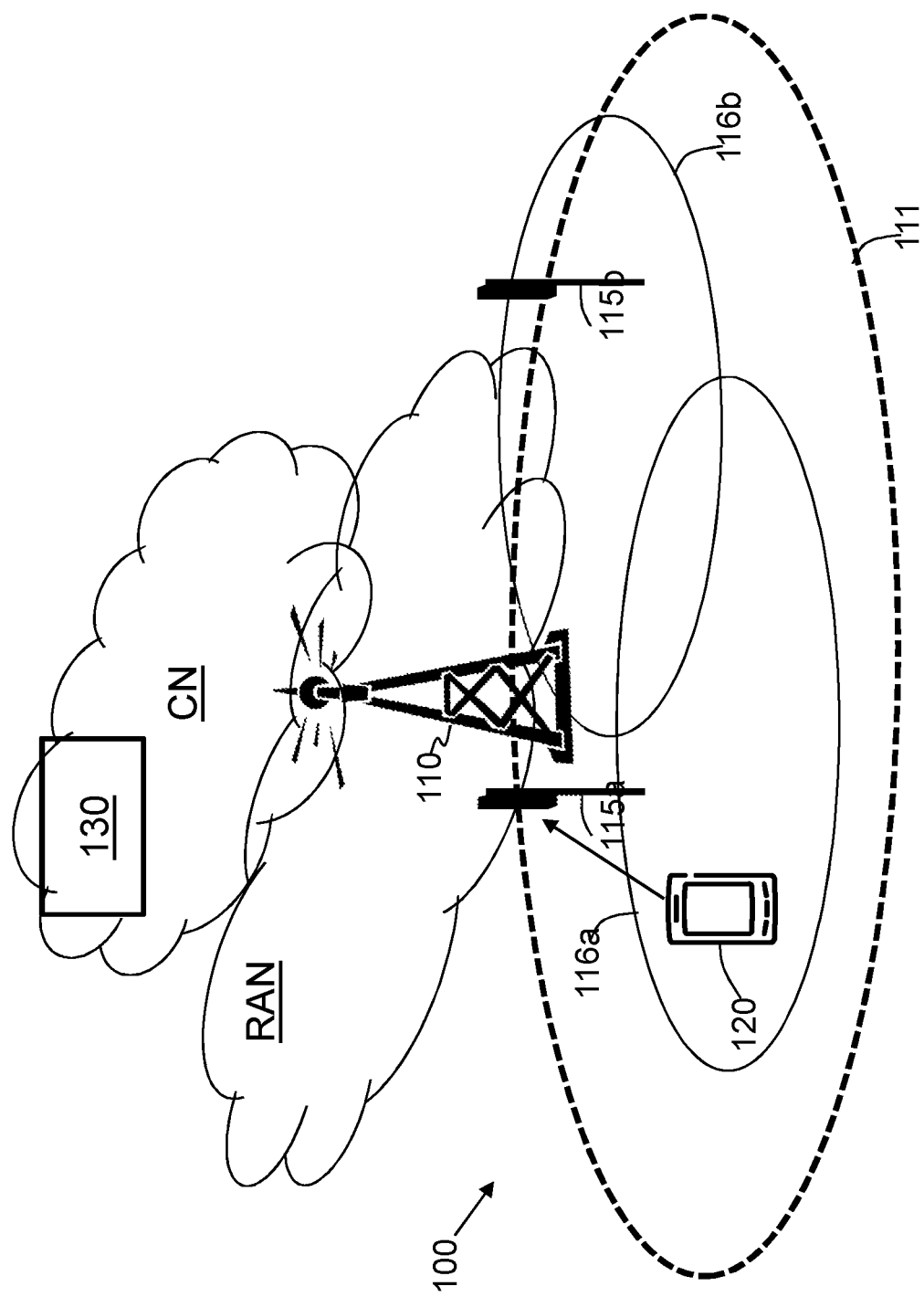
FIG. 3 is a schematic block diagram depicting embodiments of a wireless communications network.

Embodiments herein relate to wireless communication networks in general. FIG. 3 is a schematic overview depicting a wireless communication network 100. The wireless communication network 100 may e.g. comprise one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Embodiments herein relate to recent technology trends that are of particular interest in a 5G context, however, embodiments are also applicable in further development of the existing wireless communication systems such as e.g. WCDMA and LTE.

The wireless communication network 100 comprises a radio network node 110 providing radio coverage over a geographical area, which may also be referred to as an a anchor cell 111, alternative names are also possible such as super-cell, hyper-cell, central-cell, overlay-cell, controller-cell, etc., which may also be referred to as a beam or a beam group of a first radio access technology (RAT), such as 5G, LTE, Wi-Fi or similar. 110.

The radio network node 110 may be a transmission points e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 110 depending e.g. on the first radio access technology and terminology used.

The radio network node 110 may be referred to as a serving radio network node and communicates with a UE 120 with Downlink (DL) transmissions to the UE 120 and Uplink (UL) transmissions from the UE 120.

The radio network node 110 may be associated with one or more transmission and points (TPs) 115, e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 110.

The TPs 115 provide radio coverage over a geographical areas, which may also be referred to as an cells 111, which may also be referred to as a beam or a beam group of a first radio access technology (RAT), such as 5G, LTE, Wi-Fi or similar.

This means that according to some embodiments herein, the radio network node 110 providing an anchor cell 111 is associated with one or more TPs, 115 each providing a respective cell 116. The anchor cell 111 is a higher hierarchy level cell than the cells 116 provided by the one or more TPs 115.

In the wireless communication network 100, wireless devices e.g. a UE 120 such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, M-MTC device, Device to Device (D2D) terminal, or node e.g. smart phone, laptop, mobile phone, sensor, relay, mobile tablets or even a small base station communicating within a cell.

A network node 130 operates in the wireless communications network 100. The network node 130 may e.g. be an operation and maintenance node or a mobility management entity node, supporting the wireless communications network 100.

Embodiments herein provide a hierarchical tracking area definition such as e.g.:

A first level Tracking Area Code (TAC1) is broadcasted from one (or more) network node(s) (a.k.a. anchor node/cell, hyper-cell/node, umbrella cell/node, etc.). The first level tracking area code (TAC1) may interchangeably be referred to as the first TAC.

The first tracking area is associated with a TAC and comprises second level tracking area codes here denoted Tracking Area Parts Codes (TAP). The first tracking area may e.g. be sub-divided into the tracking area parts each associated with a TAP.

In the example scenario in FIG. 3, the UE 120 is located in the anchor cell 116 which is served by the radio network node 110 associated with the first TAC. In FIG. 3, the network node 110 providing the anchor cell 116 is associated with two TPs 115a and 115b each providing a cell 116a and 116b. Each cell 116a,b is associated with a respective TAP. The UE 120 is located in one of the two cells 115, which is in cell 115a served by TP 115a. This TP 115a is configured with, also referred to as associated with, a TAP referred to as the first TAP herein. The radio network node 110 being associated with a TAC means that the radio network node 110 is configured with the TAC. Similarly the TP 115 being associated with a TAP means that the TP 115 is configured with a TAP.

Said TAP, in the example below referred to as the first TAP, may e.g. be communicated as an explicit message e.g. on a broadcasted channel or implicitly e.g. by using a synchronization signal index. The UEs mentioned below may all be exemplified by the UE 120.

The UE 120 derives a second level tracking area code interchangeable referred to as the second TAC, as a combination of said first TAC and said TAP e.g. TAC2=f1(TAC1, TAP). The second level tracking area code is interchangeable referred to as the second TAC herein. The second TAC is used to enable different UEs to define tracking areas in different ways. A stationary or low mobility UE may e.g. determine its tracking area taking both TAC and TAP into account, thereby enabling higher precision tracking and paging resulting in reduced UE battery consumption.

The UE 120 may receive additional information such as e.g. a tracking area code table, on how to derive a tracking area code or a tracking area part from a Synchronisation Signal Index (SSI) or a PCI, e.g. TAP=f2(SSI). This is an advantage since it does not require any additional signaling.

The UE 120 may also receive information on how to derive a TAP based on a Reference Signal (RS) TAP=f3 (*RS). Such reference signals may be subject to a validity time, TAP=f3(*RS,t). Example of such RSs includes time synch signals, beam/mobility reference signals, positioning reference signals, pilot signals, beacon signals. This is an advantage since, assuming the reference signal is introduced for another purpose, no additional signal is required to define a TAP for this UE 120.

The network such as the radio network node 110, selects which UEs that may use the first level TAC and which UEs such as e.g. the UE 120 that needs a finer level TAC e.g. based on UE properties, e.g. speed, type, traffic amount, etc. and/or capabilities.

Figure 4:
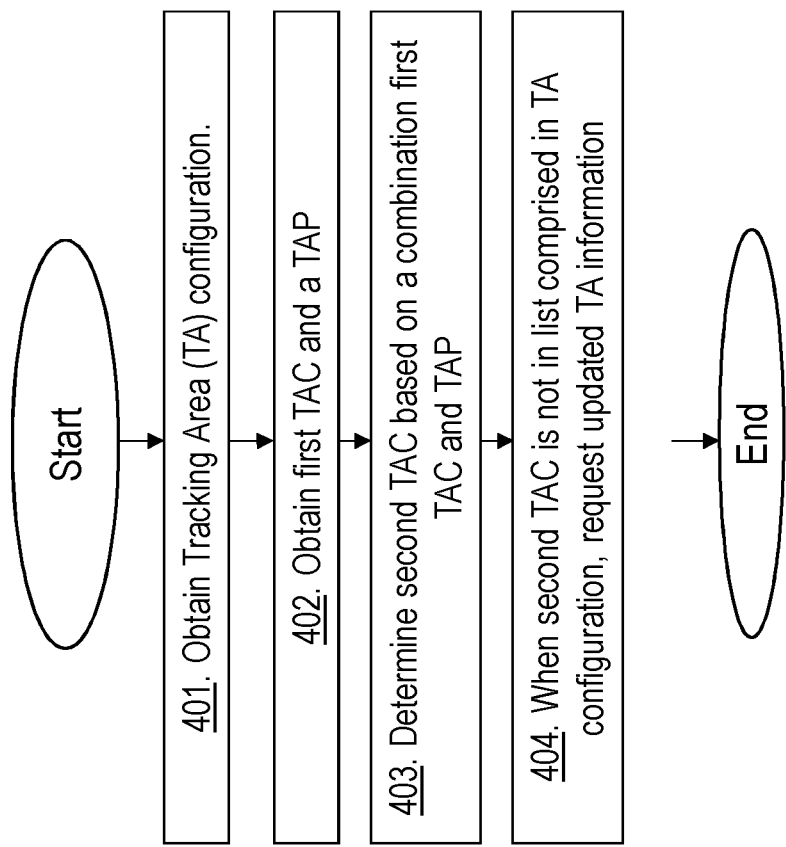
FIG. 4 is a flowchart depicting a method performed by a UE according to embodiments herein.

FIG. 4 is a flowchart depicting a method performed by the UE 120.

Example embodiments of a method performed by the UE 120 for handling Tracking Area, TA, information for the UE 120 will now be described with reference to a flowchart depicted in FIG. 4. As mentioned above, the UE 120 operates in the wireless communications network 100. In an example scenario, the UE 120 is camping on a current cell 115a and is located within the anchor cell 116 and the cell 115a. This means that the cell 115a, that serves the UE 120, is associated with a first TAC and a first TAP. Thus the UE 120 may be camping on a current cell 116 associated with the first TAC and the first TAP.

It should be noted that a TAC when used herein may mean an explicitly signaled tracking area code (TAC) information element provided in the NR-SIB1.

Figure 2:
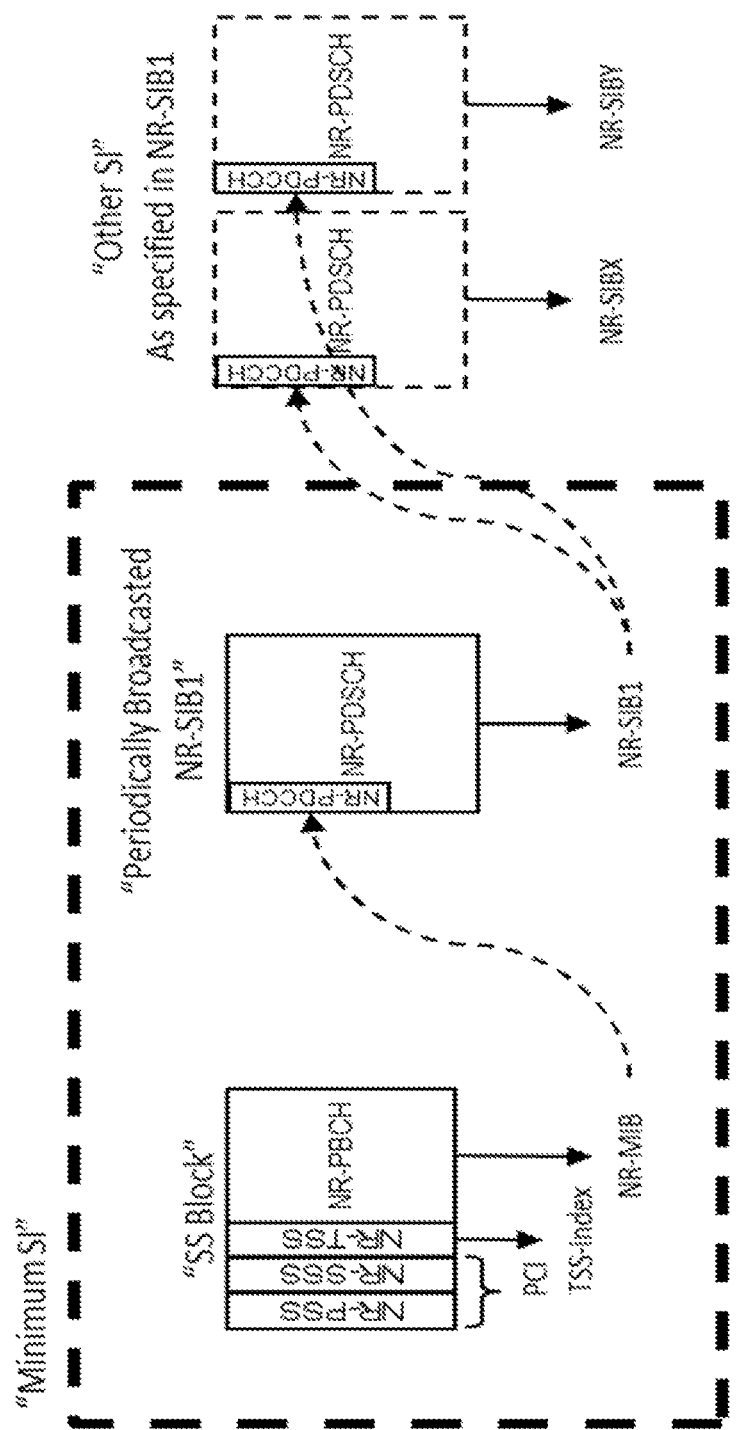
FIG. 2 is a schematic block diagram depicting an example of how some SSI and AIT principles may be implemented in 5G NR according to prior art.

It should be noted that a TAP when used herein may mean a physical cell identity (PCI) or a system information area code (SIA) provided to the UE 120 in the SS Block, see FIG. 2.

The method comprises the following actions, which actions may be taken in any suitable order.

Action 401

In the example scenario the UE 120 obtains a TA configuration e.g. with a set of tuples of a first hierarchical level TAC and e.g. a set of tuples a second hierarchical level TAP TA configuration comprising a list of allowed TAs for the UE 120. A set of tuples when used herein may mean a list of cell identities such as PCIs, a list of system information area codes such as SIAs, a list of tracking areas codes (TACs) etc. The TA configuration may be provided by an MME in the network, by the serving node such as the radio network node 110 or the TP 115a, or by some other node in the network such as the wireless communications network 100. Thus the UE 120 obtains a TA configuration comprising a list of allowed TACs, for the UE 120. The TA configuration may be obtained e.g. when the UE 120 is in RRC connected mode.

Some embodiments comprise any one or more out of:
Additional information is received, on how to derive a TAC or a TAP from a Synchronization Signal Index, SSI, e.g. TAP=f2(SSI).
additional information is received, on how to derive a TAP based on a reference signal, e.g. TAP=f3(*RS),
additional information is received, on how to derive a TAP based on a reference signal subjected to a validity time, e.g. TAP=f3(*RS,t). An example of such RSs includes time synch signals, beam/mobility reference signals, positioning reference signals, pilot signals, beacon signals.

Action 402 To gain high precision tracking for UE 120 that benefit from better tracking accuracy, embodiments herein provide a hierarchical tracking area definition such as e.g. comprising a first level TAC and a second level tracking area codes here denoted Tracking Area Parts codes (TAP). The first tracking area may e.g. be sub-divided into tracking area parts each associated with a TAP.

According to an example scenario, the UE 120 is in idle mode or inactive mode when it wakes up. The UE 120 thus monitors signals comprising TACs such as e.g. first level TACs and TAPs such as second level TAPs. This will be explained more in detail below.

The UE 120 obtains a first TAC and a first TAP, also referred to as the UE 120 detects the first TAC and the first TAP. The first TAC relates to a TA, which TA comprises a number of TA parts, each TA part being associated with a TAP.

In some example embodiments, the radio network node 110 providing an anchor cell 111 is associated with one or more TPs 115 each providing a respective cell 116. The anchor cell 111 is a higher hierarchy level cell than the cells 116 provided by the one or more TPs 115. The first TAC is related to the hierarchy level of the anchor cell 111 and the first TAP is related to the hierarchy level of the cells 116 provided by the one or more TPs 115.

Some example embodiments comprise any one or more out of:
The obtained TA configuration is a hierarchical TA configuration,
the first TAC is related to a first hierarchical level,
each TA part comprised in the TA is associated with a TAP of the second hierarchical level and
the first TAP is related to a second hierarchical level, and the second TAC is related to a second hierarchical level.

Action 403

Embodiments herein uses a combination of obtained first TAC and the first TAP for determining a second TAC, which results in high precision tracking for UEs such as the UE 120 that benefit from better tracking accuracy. In this way the performance of the wireless communication network 100 is improved. Better tracking accuracy enables paging messages to be transmitted over a smaller area. It may enable the network to directly find the UE 120 in the correct cell without first searching in a small area and gradually expanding the search. It may also enable UEs to have a shorter "on duration" time when listening for paging messages and thereby enhance the UE battery life.

The UE 120 thus determines a second TAC based on a combination the first TAC and the first TAP.

Action 404

When the UE 120 has determined the second TAC, it compares the second TAC with the list comprised in the TA configuration. When the second TAC is not in the list comprised in the TA configuration, the UE 120 requests updated TA information. In some embodiments, the UE 120 requesting of updated TA information comprises that the UE 120 establishes a connection to the wireless communications network 100 and request updated TA information.

This is since if not being in the list means that the UE 120 is located in an area where the network does not expect it to be, and hence the UE 120 will not be able to receive any paging messages in this area and a location area update is therefore needed.

If being in the list no update is needed.

The connection to the wireless communications network 100 for requesting updated TA information may be established to any one or more out of: the radio network node 110 and any one out of the TPs 115.

An advantage with the methods according to embodiments herein is that tracking area refinements may be used only when a particular UE such as the UE 120 will benefit from it, e.g. by decreasing the time window for paging reception. This refinement does not require any extra signaling in addition to a system information area specific tracking area code and the cell specific signals (e.g. SS Blocks) that each node need to transmit in idle mode.

Figure 5:
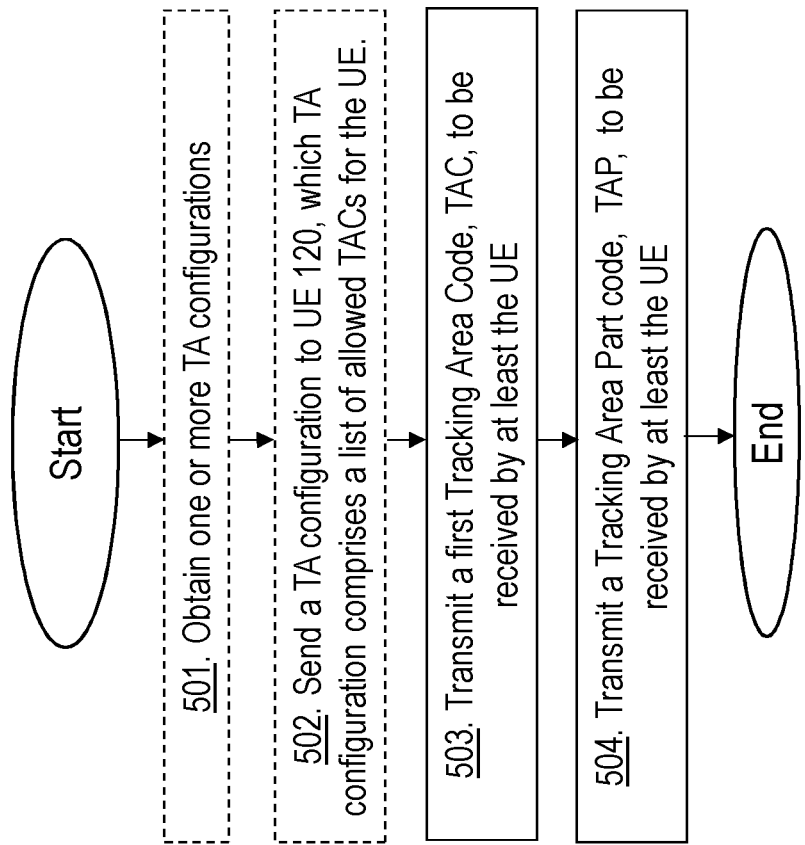
FIG. 5 is a flowchart depicting a method performed by a network such as a radio network node according to embodiments herein.

FIG. 5 is a flowchart depicting a method performed by the wireless communications network 100 such as the radio network node 110 e.g. an anchor node, or Transmission Point, TP, 115.

Example embodiments of a method performed by the radio network node 110 for handling TA information for a UE 120, will now be described with reference to a flowchart depicted in FIG. 5. As mentioned above, the UE 120 and the radio network node 110 operate in the wireless communications network 100. As mentioned in the example scenario above, the UE 120 is camping on a current cell 115a and is located within the anchor cell 116 and the cell 115a. This means that the cell 115a, that serves the UE 120, is associated with a first TAC and a first TAP. Thus the UE 120 may be camping on a current cell 116 associated with the first TAC and the first TAP.

The method comprises the following actions, which actions may be taken in any suitable order.

Action 500

This is an optional Action. In some embodiments, the radio network node 110 selects which UEs that shall use the first level TAC and which UEs that need a second level TAC based on any one or more out of: UE properties, UE speed, UE type, traffic amount and UE capabilities. Thus the radio network node 110 may selects the UE 120 to use the first level TAC or that the UE 120 need a second level TAC based on any one or more out of: UE 120 properties, UE 120 speed, UE 120 type, traffic amount and UE 120 capabilities.

Action 501

This is an optional Action. In some embodiments, the radio network node 110 obtains one or more TA configurations by e.g. determining it or receiving it from a network node 130 e.g. an Operation and maintenance node or a mobility management entity node, supporting the wireless communications network 100. This may e.g. be a TAC configuration of signal and resources relating to the first TAC, and a TAP configuration of signal and resources relating to the TAP.

Action 502

This is an optional Action. In these embodiments, the radio network node 110 may send a TA configuration to the UE 120, which TA, configuration comprises a list of allowed TACs for the UE 120. The TA configuration for the UE 120 may be one of the obtained TA configurations obtained in Action 501.

The TA configuration may be sent to the UE 120 e.g. via the one or more TPs 115. When TP 115a is serving the UE 120 it may be sent via this TP 115a.

Action 503

The radio network node 110 transmits a first TAC to be received by at least the UE 120. The first TAC relates to a Tracking Area. The TA comprises a number of TA parts, each TA part being associated with a TAP.

The transmitting of the first TAC may be performed by configuring the one or more TPs 115 or any other network node to perform the transmission, Action 504

The radio network node 110 transmits a first TAP to be received by at least the UE 120.

The transmitting of the first TAP may be performed by configuring the one or more TPs 115 to perform the transmission.

In some example embodiments, the radio network node 110 providing an anchor cell 111 is associated with one or more TPs 115 each providing a respective cell 116. The anchor cell 111 is a higher hierarchy level cell than the cells 116 provided by the one or more TPs 115. The first TAC is related to the hierarchy level of the anchor cell 111 and the first TAP is related to the hierarchy level of the cells 116 provided by the one or more TPs 115.

Some example embodiments comprise any one or more out of:
The obtained TA configuration is a hierarchical TA configuration,
the first TAC is related to a first hierarchical level,
each TA part comprised in the TA is associated with a TAP of the second hierarchical level the first TAP is related to a second hierarchical level, and the second TAC is related to a second hierarchical level.

Figure 6:
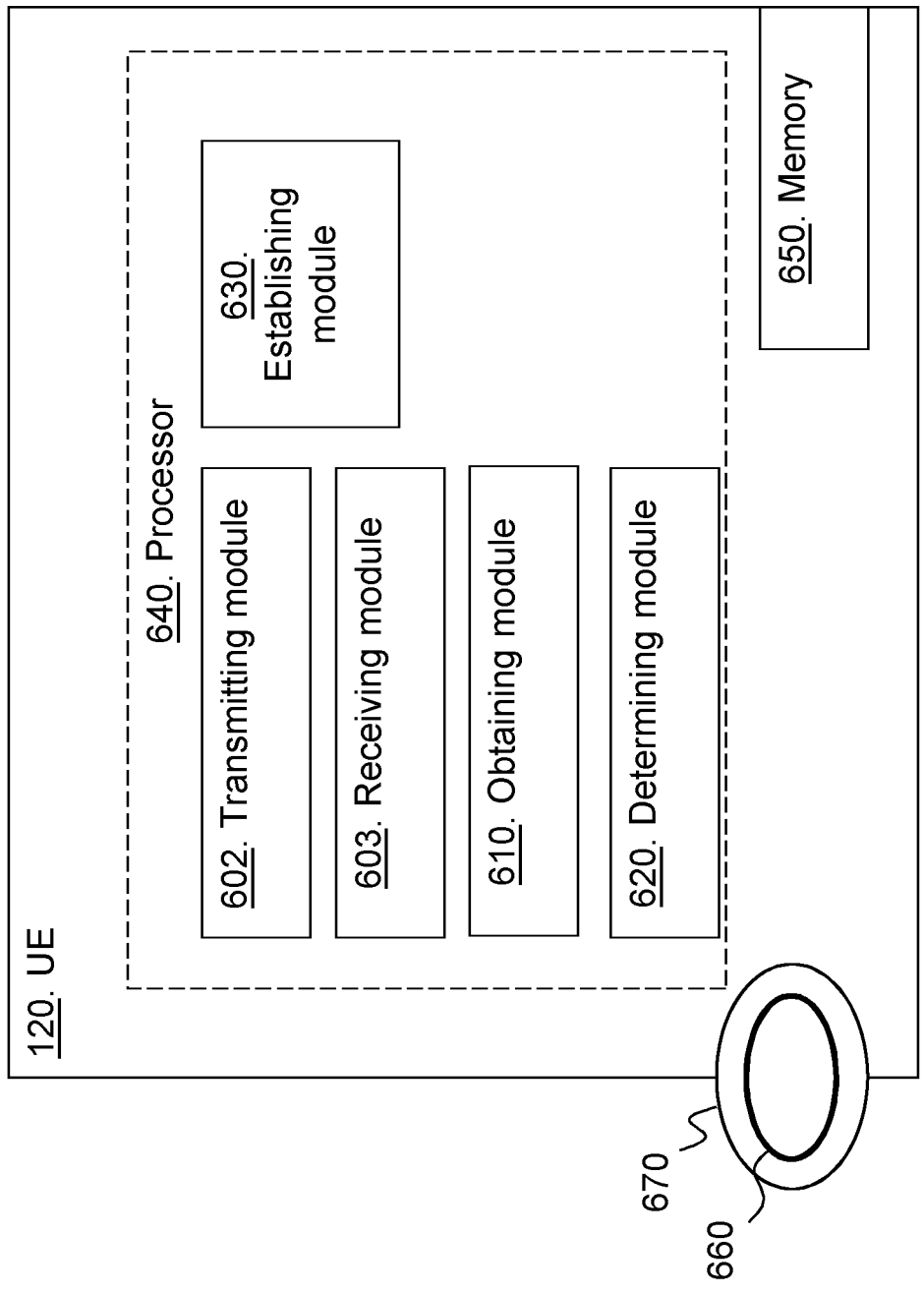
FIG. 6 is a schematic block diagram depicting a UE according to embodiments herein.

FIG. 6 is a schematic block diagram depicting the UE 120.

To perform the method actions for handling Tracking Area, TA, information for the UE 120, the UE 120 may comprise the following arrangement depicted in FIG. 6.

The UE 120 is configured to operate in a wireless communications network 100.

The UE 120 may e.g. comprise a transmitting module 602, a receiving module 603, an obtaining module 610, a determining module 620, and an establishing module 630, a processor 640 and a memory 650.

The UE 120 is configured to, e.g. by means of an obtaining module 610 configured to, obtain a TA, configuration adapted to comprise a list of allowed TACs for the UE 120, and to obtain a first TAC and a first TAP. The first TAC is adapted to relate to a TA. The TA is adapted to comprise a number of TA parts, each TA part adapted to being associated with a TAP.

The UE 120 is further configured to, e.g. by means of a determining module 620 configured to determine a second TAC based on a combination the first TAC and the first TAP, The UE 120 is further configured to, e.g. by means of an establishing module 630 configured to, when the second TAC is not in the list comprised in the TA configuration, request updated TA information.

The UE 120 is further configured to, e.g. by means of the establishing module 630 further being configured to, request the updated TA information by establishing a connection to the wireless communications network 100 and request updated TA information.

The connection to the wireless communications network 100 for requesting updated TA information, may be configured to be established to any one or more out of the radio network node 110 and any one out of the TPs 115.

According to some embodiments, the radio network node 110 providing an anchor cell 111 is configured to be associated with one or more TPs 115 each being configured to provide a respective cell 116. The anchor cell 111 is adapted to be a higher hierarchy level cell than the cells 116 provided by the one or more TPs 115. The first TAC is adapted to be related to the hierarchy level of the anchor cell 111. The first TAP is adapted to be related to the hierarchy level of the cells 116 provided by the one or more TPs 115.

According to some embodiments, any one or more out of:
The obtained TA configuration is adapted to be a hierarchical TA configuration,
the first TAC is adapted to be related to a first hierarchical level,
each TA part comprised in the TA is adapted to be associated with a TAP of the second hierarchical level,
the first TAP is adapted to be related to a second hierarchical level, and
the second TAC is adapted to be related to a second hierarchical level.

The UE 120 may be adapted to camp on a current cell 116 associated with the first TAC and the first TAP.

The UE 120 may further be configured to, e.g. by means of the receiving module 603 configured to, receive any one or more out of:
Additional information on how to derive a TAC or a TAP from a Synchronisation Signal Index, SSI,
additional information on how to derive a TAP based on a reference signal, and
additional information on how to derive a TAP based on a reference signal subjected to a validity time.

The embodiments herein may be implemented through one or more processors, such as the processor 640, which e.g. may be a microprocessor, in the UE 120 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 650 comprising one or more memory units. The memory 650 comprises instructions executable by the processor 640. The memory 650 is arranged to be used to store e.g. assignments, information, data, configurations, etc. to perform the methods herein when being executed in the UE 120.

In some embodiments, a computer program 660 comprises instructions, which when executed by the at least one processor such as the processor 640, cause the at least one processor 640 to perform actions according to Action 401-404.

In some embodiments, a carrier 670 comprises the computer program 660, wherein the carrier is one of an electronic signal, an optical signal, an electromagnetic signal, a magnetic signal, an electric signal, a radio signal, a microwave signal, or a computer-readable storage medium.

Figure 7:
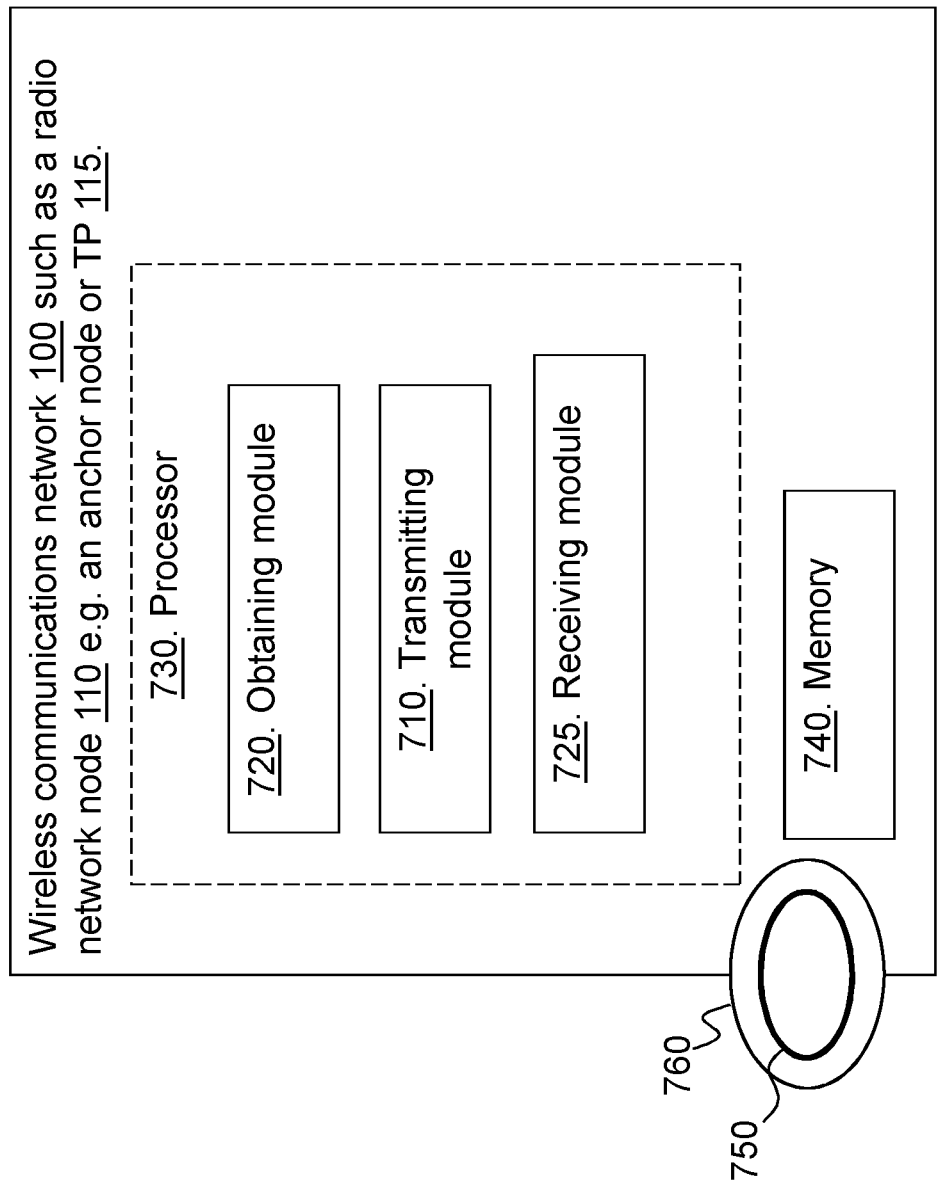
FIG. 7 is a schematic block diagram depicting a network such as a radio network node wireless device according to embodiments herein.

FIG. 7 is a schematic block diagram depicting the wireless communications network 100 such as the radio network node 110 e.g. an anchor node, or Transmission Point, TP, 115.

To perform the method actions for handling TA information for a UE 120, the radio network node 110 may comprise the following arrangement depicted in FIG. 7

The UE 120 and the radio network node 110 are configured to operate in the wireless communications network 100.

The radio network node 110 may e.g. comprise a transmitting module 710, an obtaining module 720, a receiving module 725, a processor 730 and a memory 740.

The radio network node 110 is configured to, e.g. by means of the transmitting module 710 configured to, transmit a first TAC adapted to be received by at least the UE 120. The first TAC is adapted to relate to a TA. The TA is adapted to comprise a number of TA parts, each TA part being adapted to be associated with a Tracking Area Part code, TAP.

The radio network node 110 is configured to, e.g. by means of the transmitting module 710 configured to, transmit a first TAP adapted to be received by at least the UE 120.

The radio network node 110 may further be configured to, e.g. by means of an obtaining module 720 configured to, obtain one or more TA configurations.

The radio network node 110 may further be configured to, e.g. by means of the transmitting module 710 configured to, send a TA configuration to the UE 120. The TA configuration is adapted to comprise a list of allowed TACs for the UE 120.

According to an example embodiment, the radio network node 110, adapted to provide an anchor cell 111, may be adapted to be associated with one or more TPs 115. Each TP 115 is adapted to provide a respective cell 116. The anchor cell 111 is adapted to be a higher hierarchy level cell than the cells 116 provided by the one or more TPs 115. The first TAC is adapted to be related to the hierarchy level of the anchor cell 116, and the first TAP is adapted to be related to the hierarchy level of the cells 116 provided by the one or more TPs 115.

The radio network node 110 comprises any one or more out of:
- The obtained one or more TA configurations are adapted to be hierarchical TA configurations,
- the first TAC is adapted to be related to a first hierarchical level,
- each TA part comprised in the TA is adapted to be associated with a TAP of the second hierarchical level,
- the first TAP is adapted to be related to a second hierarchical level, and
- the second TAC is adapted to be related to a second hierarchical level.

The radio network node 110 may further be configured to, e.g. by means of the transmitting module 710 configured to, transmit the first TAC by configuring the one or more TPs 115 or any other network node to perform the transmission, and transmit a first TAP by configuring the one or more TPs 115 to perform the transmission.

The radio network node 110 may further be configured to, e.g. by means of the processor 730 configured to select which UEs that shall use the first level TAC and which UEs that need a second level TAC based on any one or more out of: UE properties, UE speed, UE type, traffic amount and UE capabilities.

The embodiments herein may be implemented through one or more processors, such as a processor 730, which e.g. may be a microprocessor, in the wireless communications network 100 such as a radio network node 110 e.g. an anchor node or TP, depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the the wireless communications network 100 such as a radio network node 110 e.g. an anchor node or TP. One such carrier may be in the form of a CD ROM disc. It is however feasible with other data carriers such as a memory stick. The computer program code may furthermore be provided as pure program code on a server and downloaded to the wireless communications network 100 such as a radio network node 110 e.g. an anchor node or TP.

The wireless communications network 100 such as a radio network node 110 e.g. an anchor node or TP, may further comprise a memory 740 comprising one or more memory units. The memory 740 comprises instructions executable by the processor 730. The memory 740 is arranged to be used to store e.g. assignments, priority orders, information, data, configurations, etc. to perform the methods herein when being executed in the wireless communications network 100 such as a radio network node 110 e.g. an anchor node or TP.

In some embodiments, a computer program 750 comprises instructions, which when executed by the at least one processor such as the processing unit 730, cause the at least one processor 730 to perform actions according to any of the Actions 501-504.

In some embodiments, a carrier 760 comprises the computer program 750, wherein the carrier is one of an electronic signal, an optical signal, an electromagnetic signal, a magnetic signal, an electric signal, a radio signal, a microwave signal, or a computer-readable storage medium.

Figure 8:
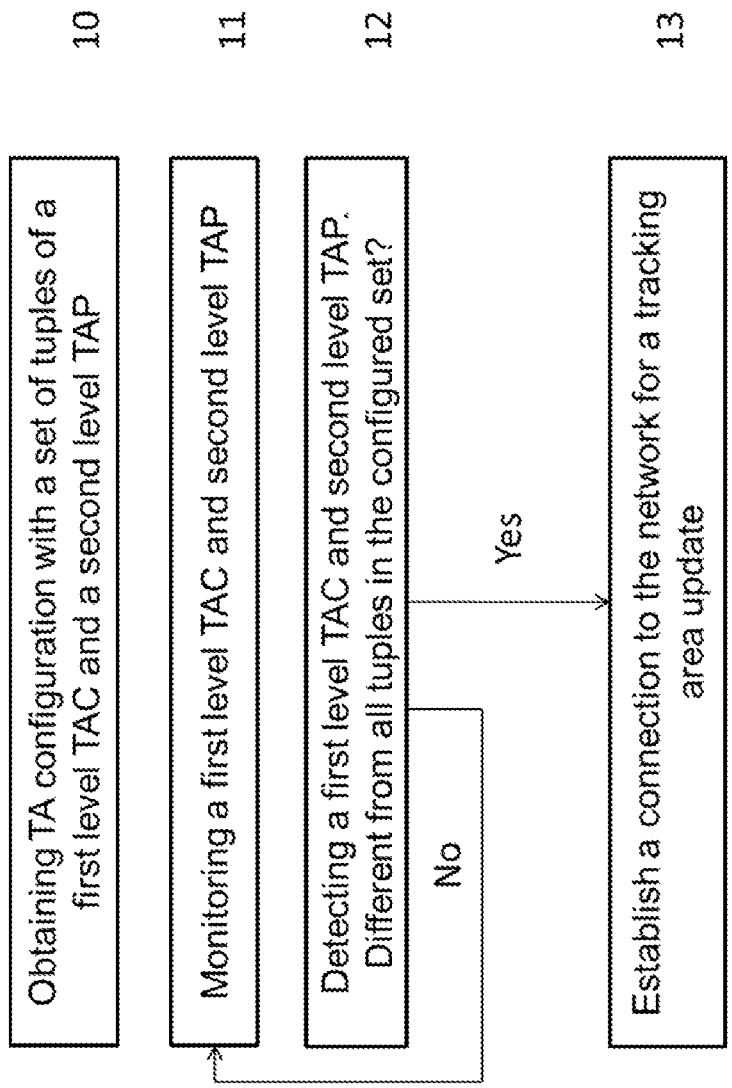
FIG. 8 is a flowchart depicting a method performed by a UE according to some embodiments herein.

FIG. 8 is a flow chart illustrating example steps of embodiments herein from a UE 120 perspective.

The UE 120 obtains a TA configuration e.g. with a set of tuples of a first level TAC and a second level TAP (step 10). TA configuration comprises a list of allowed TAs for the UE 120. The TA configuration may be provided by a MME in the network, by the serving node, or by some other node in the network. This step is related to Action 401 above.

The UE 120 monitors TACs such as e.g. first level TACs and TAPs also referred to as second level TAPs (step 11). This step is related to Action 402 above.

When detecting or obtaining a first level TAC and/or a second level TAP, it compares to the configured set of tuples with first level TAC and second level TAP (step 12). The UE 120 may e.g. determine a second TAC based on a combination of the first TAC and the TAP. This step is related to Action 402 and 403 above.

If detected tuple is different from all tuples in the configured set, then the UE 120 establishes a connection to the network for a tracking area update (step 13). E.g. if the second TAC is not in the configured list then the UE 120 establishes a connection to the network for a tracking area, or location area, or routing area update. This step is related to Action 404 above.

Figure 9:
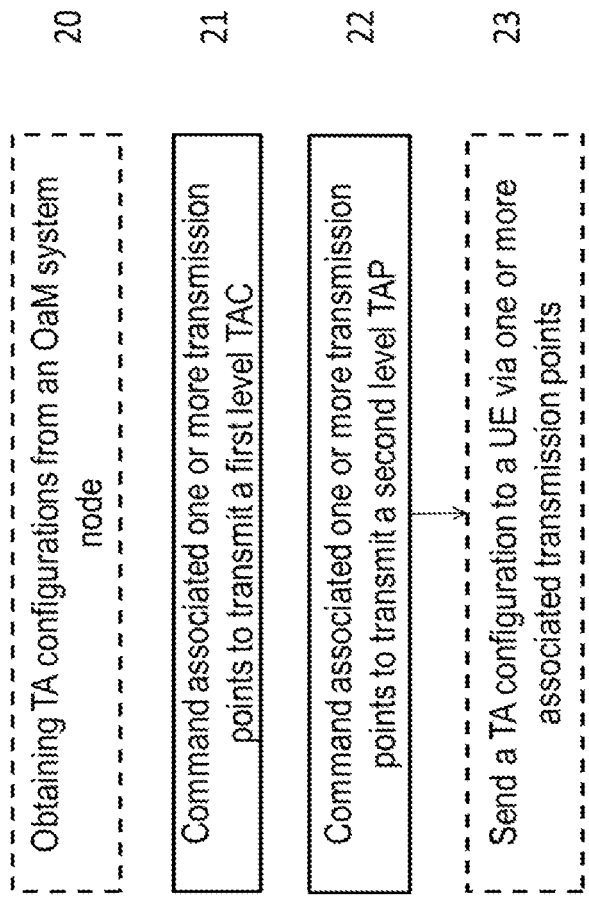
FIG. 9 is a flowchart depicting a method performed by a network such as a radio network node according to some embodiments herein.

A flow chart for example steps of embodiments herein from a network such as e.g. the network node 110 perspective is depicted in FIG. 9.

The radio network node 110 optionally obtains TA configurations (one or more) from an OaM system node (step 20). This step is related to Action 501 above.

The radio network node 110 is associated with one or more transmission points 115, and the network node commands one or more of the transmission points to transmit the first level TAC according to a TAC configuration of signal and resources (step 21). This step is related to Action 503 above.

Furthermore, the radio network node 110 commands or configures one or more of the transmission points to transmit the second level TAP according to a TAP configuration of signal and resources (step 22). This step is related to Action 504 above.

Optionally, the radio network node 110 sends a TA configuration with a tuple of first level TAC and second level TAP (step 23). This step is related to Action 502 above.

Figure 10:
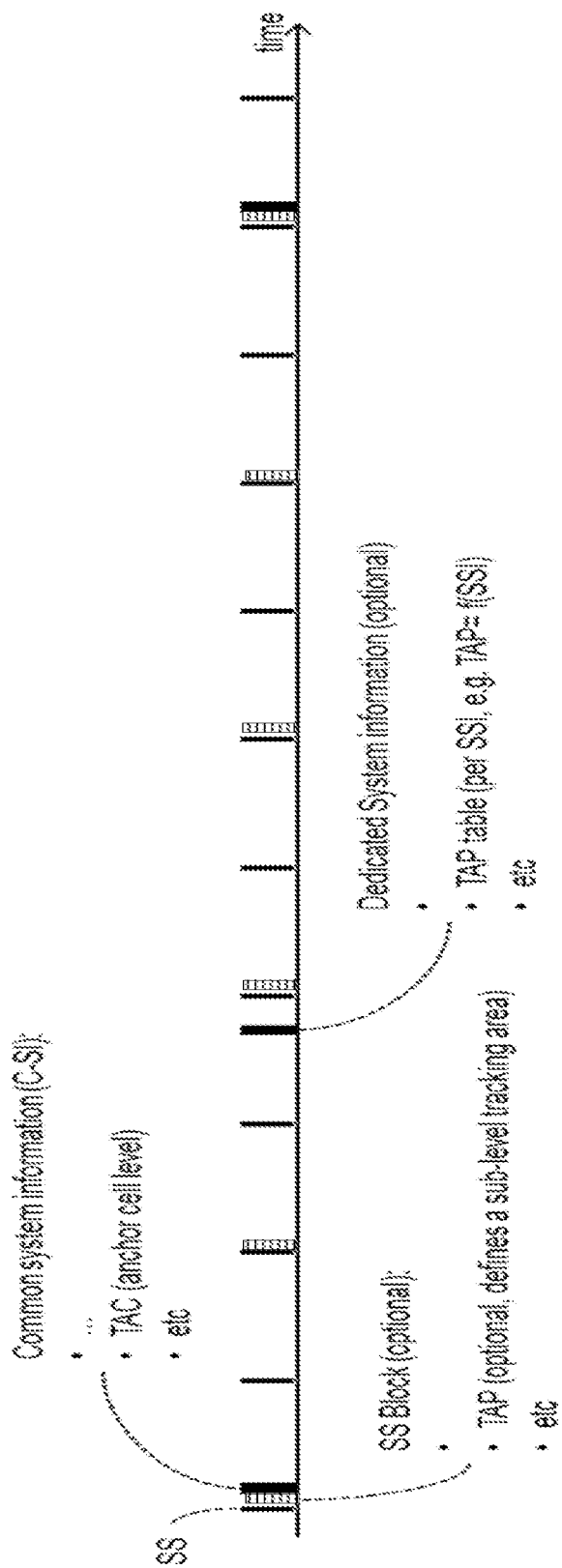
FIG. 10 is a schematic diagram depicting example embodiments.

An example when embodiments herein may be applied is in a future NX system. Current assumptions on NX involve a System Signature (SS) signal that is transmitted with a periodicity in the range 5-100 ms, see FIG. 10. The SS is associated with a system signature index, SSI. FIG. 10 depicts an example of a system design utilizing embodiments herein.

In addition the SS may be associated with a payload that is transmitted in an SS Block (SSB). This additional payload is typically transmitted after every Nth SS, with N in the range N=1, 2, . . . , 20. The SSB may comprise a second level tracking area code, also denoted tracking area part (TAP) that then becomes associated with the corresponding SS.

Common System Information (C-SI) may also be broadcasted with a periodicity in the range of 5-2000 ms. The C-SI may have a dynamic size, and it comprises at least first level (anchor node) tracking area code (TACa), such as first TAC. In addition the C-SI is assumed to also contain the C-AIT discussed above.

Dedicated System information (D-SI) may be optionally communicated to UEs such as UE 120. For the purpose of embodiments herein, the important part is that the D-SI may comprise information on how to refine tracking area information on a smaller granularity that the first level TACa provided in the C-SI. This may e.g. be performed by providing a table or a mapping function that allows the UE to decide a TAP based on a received SS. The D-SI is sent to selected UEs such as the UE 120, when they are in active mode. D-SI may be sent as a dedicated message for D-SI to the UE 120 or as part of a dedicated configuration message to the UE 120, where the D-SI is part of the configuration information. The dedicated message to the UE 120 may be a release message also instructing the UE 120 to discontinue the connection.

Figure 11:
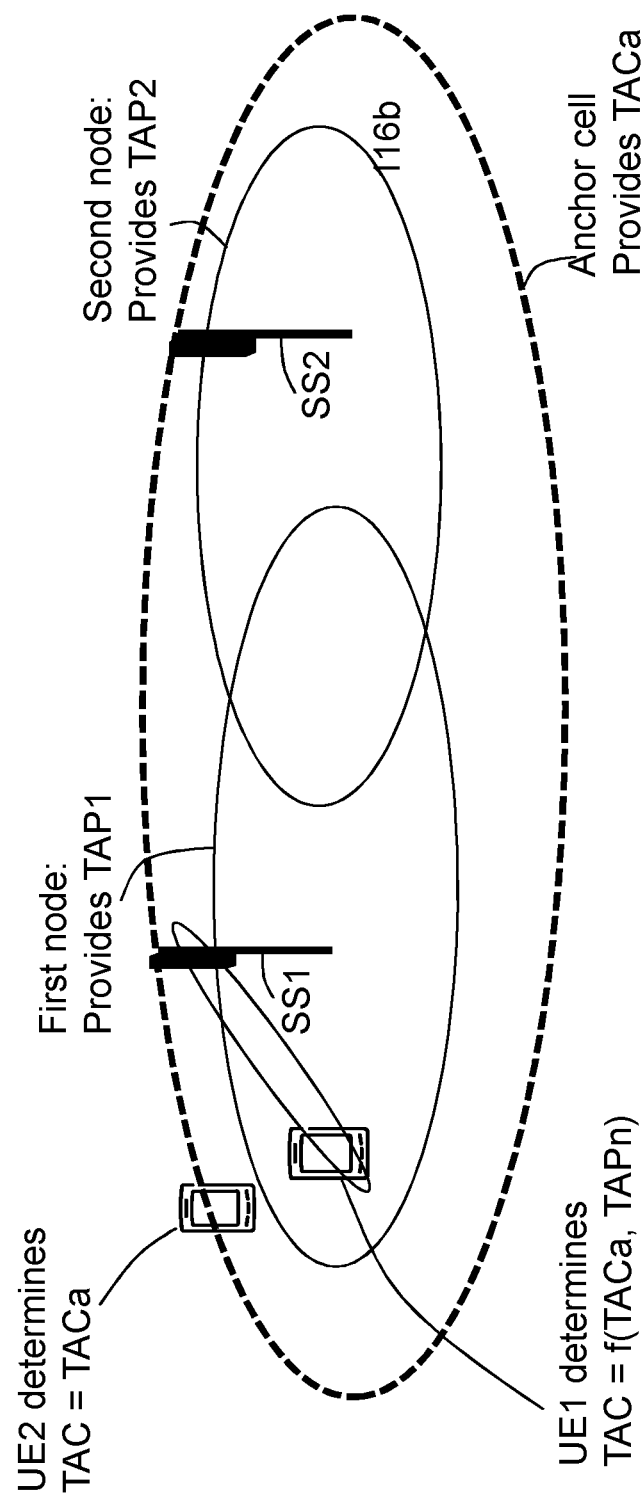
FIG. 11 is a schematic diagram depicting example embodiments.

Example of a first UE (UE1), such as UE 120 using a finer granularity tracking area determination than a second UE is depicted in FIG. 11. In this example, a first set of UEs (e.g. high speed UEs) is enabled to perform coarse tracking based on the TACa that is broadcasted in the C-SI from the anchor cell. Coarse tracking means that the UE position is known to the network on a coarse granularity requiring that paging messages are transmitted over a large area. In addition, an option to perform fine level tracking for a second set of UEs (UE2) is provided, e.g. stationary or slow moving UEs, such as e.g. the UE 120 by e.g. the radio network node 110 instructing these second UEs to utilize the TAP information that may be broadcasted in the SSBs or alternatively by providing them with information on how to translate a received SSI into a TAP, e.g. by means of a function or a table.

How to Signal the Tracking Area Code Part (TAP).

Figure 12:
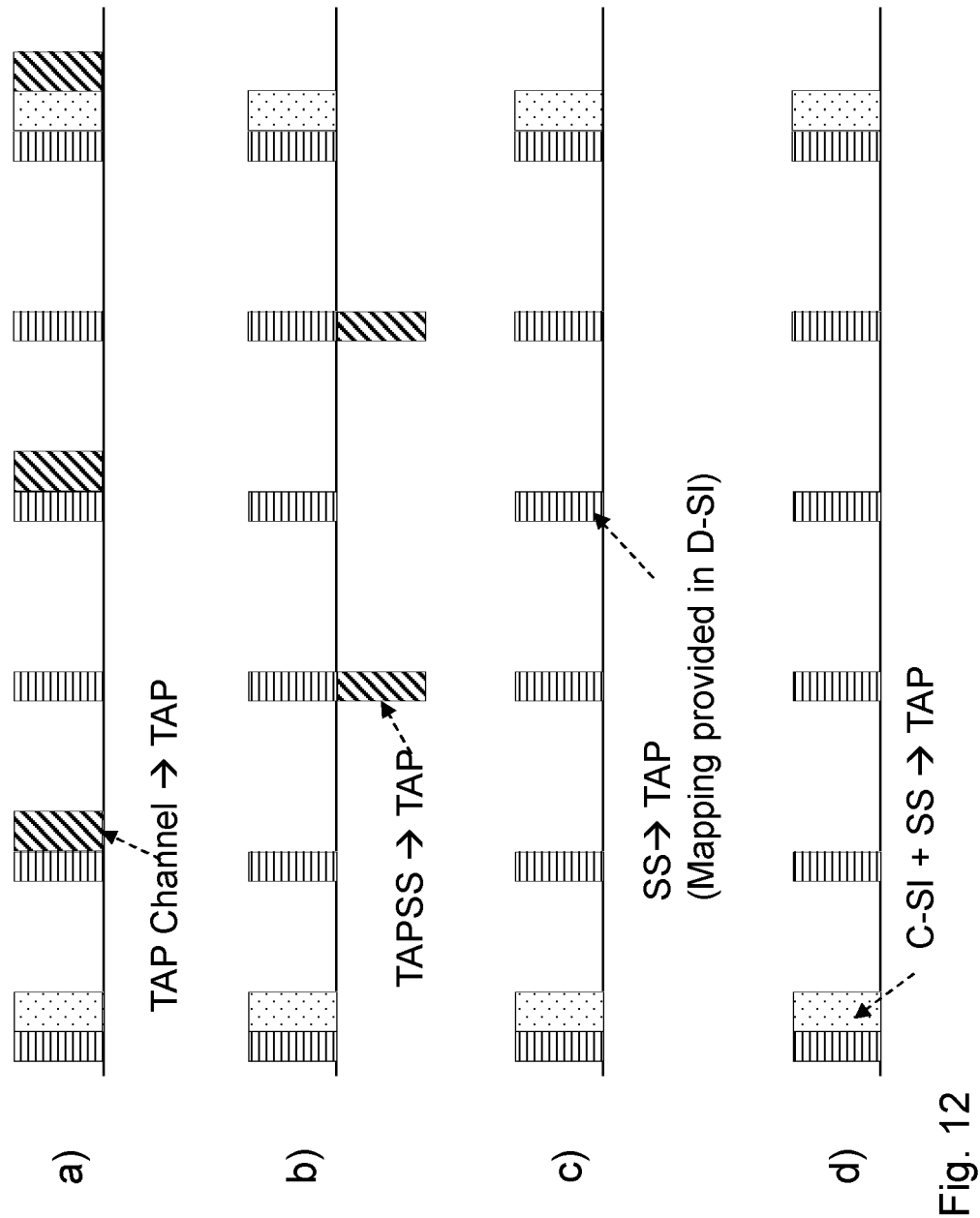
FIG. 12 is a schematic diagram depicting example embodiments.

Signaling of the first and second level tracking area codes first TAC also referred to as TACa, and TAP respectively, may be performed in different ways. Embodiments herein are not concerned about how the TAP is communicated but rather on how it is used selectively to create hierarchical and UE optimized tracking areas. The first TAC, such as the first level tracking area code (TACa) may be broadcasted as part of the common system information. Some alternatives for how the TAP information may be communicated are shown in FIG. 12. FIG. 12 depicts different alternatives for transmission of TAP information. Color codes used in FIG. 12 are as follows: box marked with upward horizontal stripes denotes SS, box marked with dots denotes C-SI, and box marked with upward diagonal stripes denotes a new signal or channel only designed for communicating the TAP. From top to bottom these examples are as follows:

Alternative 1 depicted in FIG. 12a): TAP is communicated in "physical channel".

Alternative 2: depicted in FIG. 12b)TAP is communicated by the index of a new "sync signal".

Alternative 3: depicted in FIG. 12c)TAP is derived from existing sync signal (SS or MRS).

Alternative 4 depicted in FIG. 12d): Part of TAP is encoded in C-SI.

Note that this is not an exhaustive list of possible alternatives but only some examples depicting how the second level tracking area information may be encoded and communicated in a future NX system.

Additional Embodiments

According to some embodiments, an obvious extension is to extend it to more than two hierarchical levels. Determination of the tracking area code for the UE 120 may include one or more PLMN IDs, explicitly signaled or derived TACs, explicitly signaled or derived TAPs, reception of different signals such as synchronization signals (SS) and Mobility Reference Signals (MRS), etc. In general the tracking area code determination for a particular UE may be determined as a function involving many different types of information, i.e. TAC=f(PLMN $ID_1$, . . . , PLMN $ID_K$, $TAC_{a1}$, . . . , $TAC_{aN}$, $TAP_1$, . . . , $TAP_M$, $SS_1$, . . . , $SS_L$, $MRS_1$, . . . , $MRS_P$).

In some embodiments, different levels in the tracking area hierarchy may be overlapping, partly or fully.

The TAP may in some embodiments, be configured as a function of different kinds of reference signals such as mobility/beam reference signals, demodulation reference signals, synchronization signals, positioning signals, channel state information reference signals, measurement reference signals etc. The signals are characterized by a waveform, such as modulated encoded sequence, and a search space such as time/frequency resource where the signal can be transmitted. The search space may be expressed in relation to a time and/or frequency reference, which in turn can be another reference signal for example realizing a first level TAC, or a synchronization signal like the SS, or a beacon (pilot/perch) signal, etc.

The TAP search space and configuration may be configured via AIT, C-SI, D-SI or other common/dedicated signaling.

The TAP may also be subject to a validity time, meaning that the TAP configuration is only valid in a time window.

In some embodiments, the availability of different tracking area levels may vary over time, e.g. few levels during low traffic, or when subject to certain device mixes. This may be implemented as TAP levels with a validity time, and the level shall be assumed to not be available when the validity time has expired. The TAP level becomes available again after the UE 120 has retrieved a new TAP configuration.

UE Perspective

Figure 13:
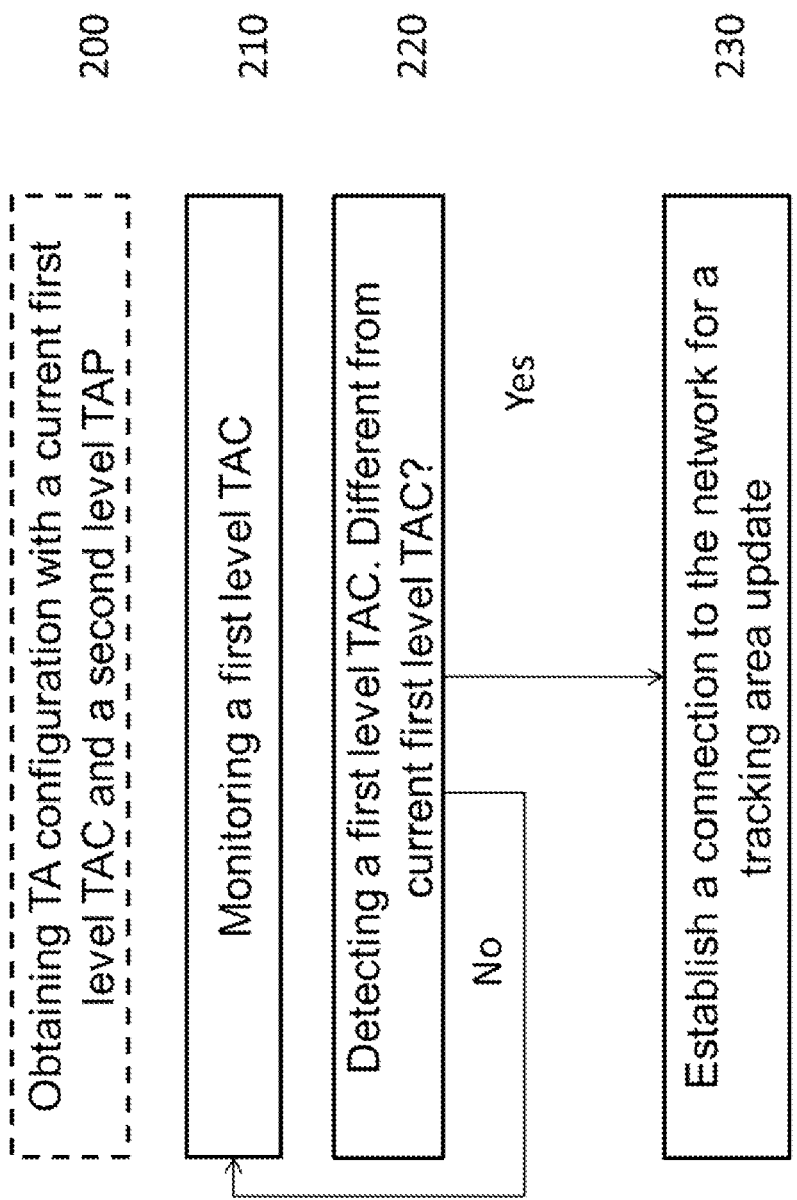
FIG. 13 is a flowchart depicting embodiments of a method performed by a UE.

According to some embodiments, the aspect here is to emphasize that either TAC or TAP may be different from the TA configuration and thereby trigger a tracking area update. Also, that the TA configuration (typically TAP) may be subject to a validity time. FIG. 13 is a flow chart of some example embodiments from a UE 120 perspective, depicting a change in first level TAC.

The UE 120 may be configured with a hierarchical TA, which is at least a combination of a first TAC and a TAP (step 200), and is camping on a current cell related to a first TAC.

Figure 14:
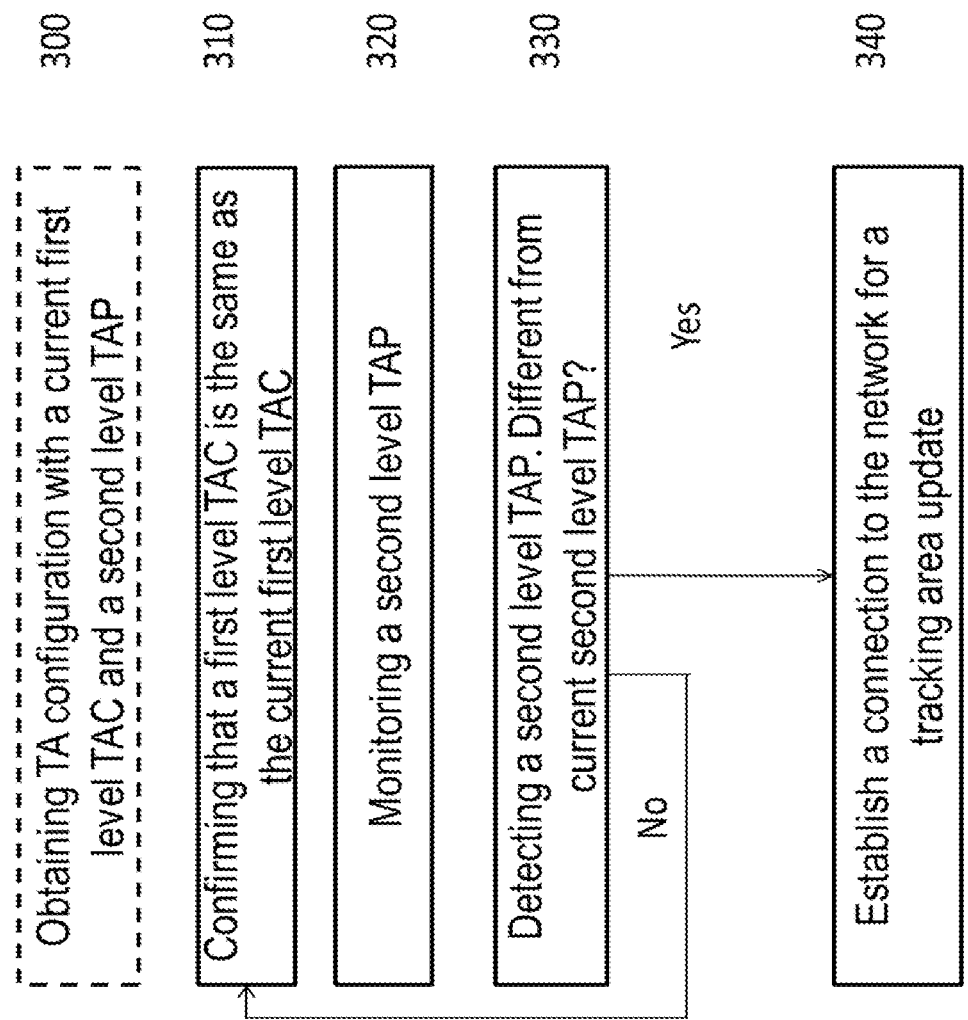
FIG. 14 is a flowchart depicting embodiments of a method performed by a UE.

The UE 120 will in one embodiment monitor the first level TAC (step 210), and when detecting a first TAC (step 220) that is different from the current first level TAC, it will establish a connection to the network such as the wireless communications network 100, for a tracking area update (step 230). Thus either the TAC or TAP can be different from the TA configuration and thereby trigger a tracking area update FIG. 14 is a flow chart of some example embodiments depicting a change in second level TAP from a UE 120 perspective.

The UE 120 is in this example configured with a hierarchical TA, which is at least a combination of a first TAC and a TAP (step 300), and is camping on a current cell associated with the first TAC and a TAP. The UE 120 will in another embodiment monitor the first level TAC (step 310) and confirming that it is the same as the current first TAC. Moreover, it is also monitoring a TAP (step 320), and when detecting a TAP (330) that is different from the current second level TAP, it will establish a connection to the network for a tracking area update (step 340).

In this embodiment, as well as the embodiment depicted in FIG. 13, there is no hierarchical dependency between TAC and TAP. A location area update may be triggered by that the TAC changes even though the TAP is the same, see FIG. 13, or by that the TAP changes even though the TAC is the same, see FIG. 14. The UE 120 monitors two signals or messages and obtains TAC and TAP.

Normally a TAC comprises one or more TAP. But in these two embodiments the TAP and TAC are not related like that.

Figure 15:
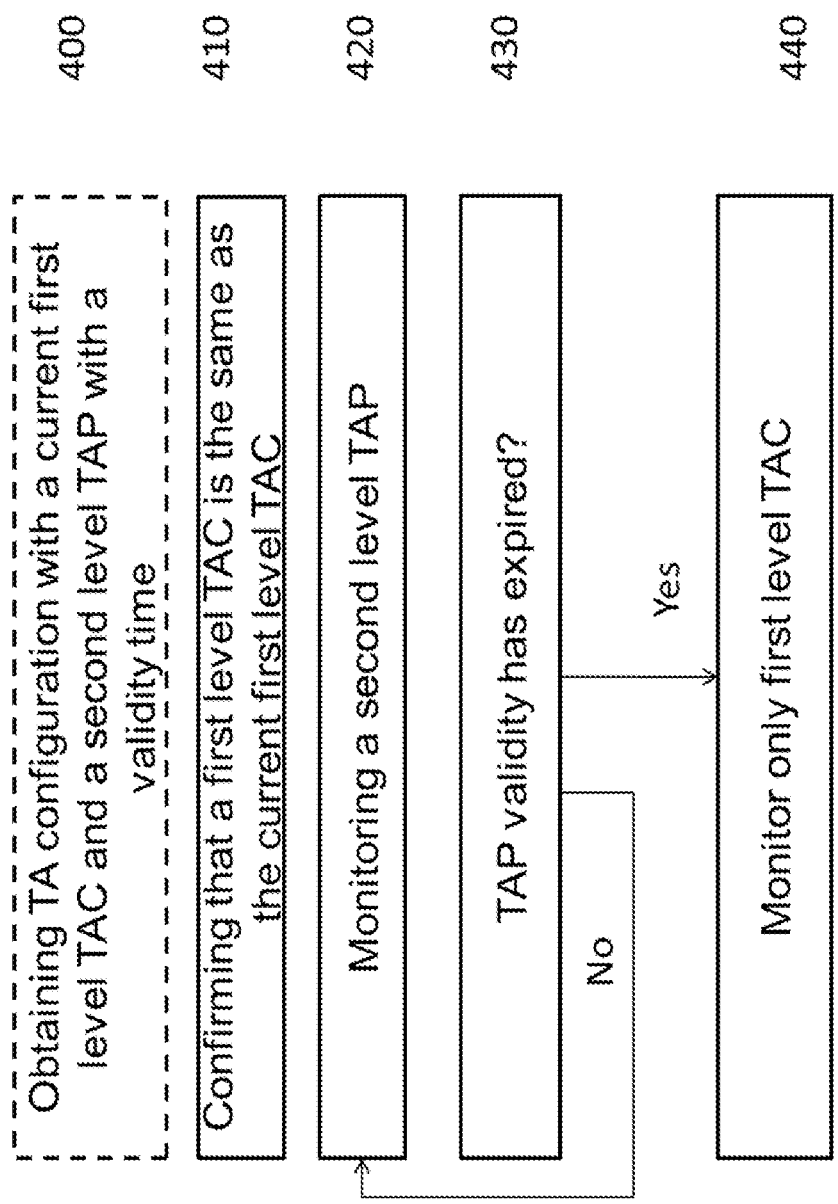
FIG. 15 is a flowchart depicting embodiments of a method performed by a UE.

FIG. 15 is a flow chart of some example embodiments depicting from a UE 120 perspective, detecting an expired TAP validity time. The UE 120 is in this example configured with a hierarchical TA, which is at least a combination of a first TAC and a TAP, where the TAP is subject to a validity time (step 400). The UE 120 is camping on a current cell associated with e first TAC and a TAP. The UE 120 will in another embodiment monitor the first TAC (step 410) and confirming that it is the same as the current first TAC. Moreover, it is also monitoring a TAP (step 420). The UE 120 checks whether the TAP validity time has expired (step 430). If it has, then the UE 120 only monitors the first TAC (step 440), i.e. the first hierarchical level, not the second hierarchical level. Optionally, the UE 120 may establish a connection to the network such as the radio network node 110 to obtain a new TAP.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein.

As such, the apparatus and techniques taught herein are not limited by the foregoing description and accompanying drawings. Instead, the embodiments herein are limited only by the following claims and their legal equivalents.

Example Embodiments Comprises

According to a first aspect the object is achieved by example embodiments of a method performed by a User Equipment, UE, 120 for handling Tracking Area, TA, information for the UE 120 are provided. See FIGS. 3 and 4. The UE 120 and e.g. a radio network node 110 being associated with one or more Transmission Points, TPs, 115, operate in a wireless communications network 100, the method comprising any one or more out of:

obtaining 401 e.g. via the one or more Transmission Points, TPs, 115, a Tracking Area, TA, configuration comprising a list of allowed Tracking Area Codes, TACs, for the UE 120, obtaining 402, a first TAC and a TAP, which first TAC relates to a TA, which TA comprises a number of TA parts, which TA parts e.g. may overlap, each TA part being associated with a Tracking Area Part code, TAP, determining 403 a second TAC based on a combination the first TAC and the TAP, when the second TAC is not in the list comprised in the TA configuration, establishing 404 a connection to the wireless communications network 100 such as e.g. the radio network node 110 or any one out of the TPs 115 and request updated TA information.

According to a second aspect, the object is achieved by example embodiments of method performed by a wireless communications network 100 such as a radio network node 110 e.g. an anchor node or Transmission Point, TP, 115 for handling Tracking Area, TA, information for a User Equipment, UE, 120. See FIGS. 3 and 5. The radio network node 110 is associated with one or more Transmission Points, TPs, 115, wherein the UE 120, the one or more TPs 115 and the radio network node 110 operate in a wireless communications network 100, the method comprising any one or more out of:

transmitting 502 a first Tracking Area Code, TAC, to be received by at least the UE 120, which first TAC relates to a Tracking Area, wherein the TA comprises a number of TA parts, which TA parts e.g. may overlap, each TA part being associated with a Tracking Area Part code, TAP, e.g. by commanding or configuring the one or more TPs 115 or any other network node to perform the transmission, and transmitting 503 a TAP to be received by at least the UE 120 e.g. by commanding or configuring the one or more TPs 115 to perform the transmission.

The method may further comprise any one or more out of:

obtaining 501 one or more TA configurations by e.g. determining it or receiving it from a network node 130 e.g. an Operation and maintenance node or a mobility management entity node, supporting the wireless communications network 100, such as e.g. a TAC configuration of signal and resources relating to the first TAC, and a TAP configuration of signal and resources relating to the TAP, and sending 504 e.g. via the one or more TPs 115, a TA configuration to the UE 120, which TA, configuration comprises a list of allowed TACs for the UE 120.

According to a third aspect, the object is achieved by example embodiments of User Equipment, UE, 120 for handling Tracking Area, TA, information for the UE 120, See FIGS. 3 and 6. The UE 120 and e.g. a radio network node 110 being associated with one or more Transmission Points, TPs, 115, are configured to operate in a wireless communications network 100. The UE 120 is configured to perform any one or more out of:

obtain, e.g. by means of an obtaining module 610, and e.g. via the one or more Transmission Points, TPs, 115, a Tracking Area, TA, configuration comprising a list of allowed Tracking Area Codes, TACs, for the UE 120, and obtain, e.g. by means of the obtaining module 610, a first TAC and a TAP, which first TAC relates to a TA, which TA comprises a number of TA parts, which TA parts e.g. may overlap, each TA part being associated with a Tracking Area Part code, TAP, determine, e.g. by means of a determining module 620, a second TAC based on a combination the first TAC and the TAP, when the second TAC is not in the list comprised in the TA configuration, establish e.g. by means of an establishing module 630, a connection to the wireless communications network 100 such as e.g. the radio network node 110 or any one out of the TPs 115 and request updated TA information.

The UE 120 may further comprise a transmitting module 602 and a receiving module 603.

According to a fourth aspect, the object is achieved by example embodiments of a wireless communications network 100 such as a radio network node 110 e.g. an anchor node or Transmission Point, TP, for handling Tracking Area, TA, information for a User Equipment, UE, 120, See FIGS. 3 and 7. The radio network node 110 is configured to be associated with one or more Transmission Points, TPs, 115. The UE 120, the one or more TPs 115 and the radio network node 110 operate in a wireless communications network 100. The wireless communications network 100 such as a radio network node 110 e.g. an anchor node or TP are configured to perform any one or more out of:

transmit e.g. by means of a transmitting module 710, a first Tracking Area Code, TAC, to be received by at least the UE 120, which first TAC relates to a Tracking Area, wherein the TA comprises a number of TA parts, which TA parts e.g. may overlap, each TA part being associated with a Tracking Area Part code, TAP, e.g. by commanding or configuring the one or more TPs 115 or any other network node to perform the transmission, transmit e.g. by means of the transmitting module 710, a TAP to be received by at least the UE 120 e.g. by commanding or configuring the one or more TPs 115 to perform the transmission.

The wireless communications network 100 such as a radio network node 110 e.g. an anchor node or TP, may further be configured to perform any one or more out of:

obtain e.g. by means of an obtaining module 720, one or more TA configurations by e.g. determining it or receiving it from a network node 130 e.g. an Operation and maintenance node or a mobility management entity node, supporting the wireless communications network 100, such as e.g. a TAC configuration of signal and resources relating to the first TAC, and a TAP configuration of signal and resources relating to the TAP, and transmit e.g. by means of the transmitting module 710, and e.g. via the one or more TPs 115, a TA configuration to the UE 120, which TA, configuration comprises a list of allowed TACs for the UE 120.

The wireless communications network 100 such as a radio network node 110 e.g. an anchor node or TP may further comprise a receiving module 725.

1 ABBREVIATIONS

Explain all abbreviations and acronyms used in the document.

3GPP Third Generation Partnership Project
eNB Enhanced NodeB
CQI Channel-Quality Indicator
CRS Cell-Specific Reference Symbol
CSI Channel-State Information
CSI-IM CSI Interference Measurement
CSI-RS CSI Reference Symbol
DCI Downlink Control Information
HARQ Hybrid Automatic Repeat-reQuest
LTE Long Term Evolution
MAC Medium Access Control
MCS Modulation and Coding Scheme
MI Mutual Information
MIMO Multiple Input Multiple Output
NDI New Data Indicator
(e)PDCCH (enhanced) Physical Downlink Control Channel
PDU Protocol Data Unit
PLMN ID Public Land Mobile Network IDentity
PMI Pre-coding Matrix Indicator
PRB Physical Resource Block
RI Rank Indicator
RV Redundancy Version
RRC Radio Resource Control
TA Tracking Area
TAC Tracking Area Code
TAP Tracking Area Part
TM Transmission Mode
TTI Transmission Time Interval
UE User Equipment

The invention claimed is:

1. A method performed by a User Equipment (UE) for handling Tracking Area (TA) information for the UE, wherein the UE operates in a wireless communications network, the method comprising:
   obtaining a TA configuration comprising a list of allowed Tracking Area Codes (TACs) for the UE;
   obtaining a first TAC and a first Tracking Area Part code (TAP), which first TAC relates to a TA, which TA comprises a number of TA parts, each TA part being associated with a TAP;
   determining a second TAC based on a combination of the first TAC and the first TAP; and
   requesting updated TA information, responsive to detecting that the second TAC is not in the list comprised in the TA configuration.

2. The method of claim 1, wherein a radio network node providing an anchor cell is associated with one or more Transmission Points (TPs), each providing a respective cell, which anchor cell is a higher hierarchy level cell than the cells provided by the one or more TPs, and wherein the first TAC is related to the hierarchy level of the anchor cell and wherein the first TAP is related to the hierarchy level of the cells provided by the one or more TPs.

3. The method of claim 1, wherein any one or more out of:
   the obtained TA configuration is a hierarchical TA configuration,
   the first TAC is related to a first hierarchical level,
   each TA part comprised in the TA is associated with a TAP of the second hierarchical level,
   the first TAP is related to a second hierarchical level, and
   the second TAC is related to a second hierarchical level.

4. The method of claim 1, wherein any one or more out of:
   additional information is received, on how to derive a TAC or a TAP from a Synchronization Signal Index (SSI);
   additional information is received, on how to derive a TAP based on a reference signal;
   additional information is received, on how to derive a TAP based on a reference signal subjected to a validity time.

5. A method performed by a radio network node for handling Tracking Area (TA) information for a User Equipment (UE) wherein the UE, and the radio network node operate in a wireless communications network, the method comprising:
   transmitting a first Tracking Area Code, TAC, to be received by at least the UE, which first TAC relates to a TA, wherein the TA comprises a number of TA parts, each TA part being associated with a Tracking Area Part code (TAP); and transmitting a first TAP to be received by at least the UE, wherein the first TAP is one of the TAPs associated with one of the number of TA parts.

6. The method of claim 5, further comprising:
obtaining one or more TA configurations; and
sending a TA configuration to the UE, which TA configuration comprises a list of allowed TACs for the UE.

7. The method of claim 5, wherein the radio network node is providing an anchor cell associated with one or more Transmission Points (TPs), each providing a respective cell, which anchor cell is a higher hierarchy level cell than the cells provided by the one or more TPs, and wherein the first TAC is related to the hierarchy level of the anchor cell, and wherein the first TAP is related to the hierarchy level of the cells provided by the one or more TPs.

8. The method of claim 5, wherein any one or more out of:
the obtained one or more TA configurations are hierarchical TA configurations,
the first TAC is related to a first hierarchical level,
each TA part comprised in the TA is associated with a TAP of the second hierarchical level,
the first TAP is related to a second hierarchical level, and
the second TAC is related to a second hierarchical level.

9. A User Equipment (UE) for handling Tracking Area (TA) information for the UE, wherein the UE is configured to operate in a wireless communications network, the UE comprising a processor and a memory comprising instructions executable by the processor whereby the UE is configured to:
obtain a TA configuration adapted to comprise a list of allowed Tracking Area Codes (TACs) for the UE;
obtain a first TAC and a first Tracking Area Part code (TAP), which first TAC is adapted to relate to a TA, which TA is adapted to comprise a number of TA parts, each TA part adapted to being associated with a TAP;
determine a second TAC based on a combination of the first TAC and the first TAP; and
request updated TA information, responsive to detecting that the second TAC is not in the list comprised in the TA configuration.

10. The UE of claim 9, wherein the UE is further configured to request updated TA information by establishing a connection to the wireless communications network and request updated TA information.

11. The UE of claim 9, wherein a radio network node providing an anchor cell is configured to be associated with one or more Transmission Points (TPs), each being configured to provide a respective cell, which anchor cell is adapted to be a higher hierarchy level cell than the cells provided by the one or more TPs, and wherein the first TAC is adapted to be related to the hierarchy level of the anchor cell and wherein the first TAP is adapted to be related to the hierarchy level of the cells provided by the one or more TPs.

12. The UE of claim 9, wherein any one or more out of:
the obtained TA configuration is a hierarchical TA configuration,
the first TAC is related to a first hierarchical level,
each TA part comprised in the TA is associated with a TAP of the second hierarchical level,
the first TAP is related to a second hierarchical level, and
the second TAC is related to a second hierarchical level.

13. The UE of claim 9, wherein the connection to the wireless communications network for requesting updated TA information, is configured to be established to any one or more out of: the radio network node and any one out of the TPs.

14. The UE of claim 9, wherein any one or more out of:
additional information is received, on how to derive a TAC or a TAP from a Synchronization Signal Index (SSI),
additional information is received, on how to derive a TAP based on a reference signal, and
additional information is received, on how to derive a TAP based on a reference signal subjected to a validity time.

15. A radio network node for handling Tracking Area (TA) information for a User Equipment (UE) wherein the UE and the radio network node are configured to operate in a wireless communications network, the radio network node comprising a processor and a memory comprising instructions executable by the processor whereby the radio network node is configured to:
transmit a first Tracking Area Code (TAC) adapted to be received by at least the UE, which first TAC is adapted to relate to a TA, wherein the TA is adapted to comprise a number of TA parts, each TA part being adapted to be associated with a Tracking Area Part code (TAP); and
transmit a first TAP adapted to be received by at least the UE.

16. The radio network node of claim 15, further being configured to:
obtain one or more TA configurations, and
send a TA configuration to the UE, which TA configuration is adapted to comprise a list of allowed TACs for the UE.

17. The radio network node of claim 15, wherein the radio network node is adapted to provide an anchor cell adapted to be associated with one or more Transmission Points (TPs), each adapted to provide a respective cell, which anchor cell is adapted to be a higher hierarchy level cell than the cells provided by the one or more TPs, and wherein the first TAC is adapted to be related to the hierarchy level of the anchor cell, and wherein the first TAP is adapted to be related to the hierarchy level of the cells provided by the one or more TPs.

18. The radio network node of claim 15, wherein any one or more out of:
the obtained one or more TA configurations are adapted to be hierarchical TA configurations,
the first TAC is adapted to be related to a first hierarchical level,
each TA part comprised in the TA is adapted to be associated with a TAP of the second hierarchical level,
the first TAP is adapted to be related to a second hierarchical level, and
the second TAC is adapted to be related to a second hierarchical level.

19. The radio network node of claim 15, further being configured to transmit the first TAC by configuring the one or more TPs or any other network node to perform the transmission, and transmit a first TAP by configuring the one or more TPs to perform the transmission.

20. The radio network node of claim 15, further being configured to:
select which UEs that shall use the first level TAC and which UEs that need a second level TAC based on any one or more out of: UE properties, UE speed, UE type, traffic amount and UE capabilities.

* * * * *